United States Patent [19]
Miyoshi et al.

[11] Patent Number: 5,379,244
[45] Date of Patent: Jan. 3, 1995

[54] SMALL-SIZED, LOW POWER CONSUMPTION MULTIPLICATION PROCESSING DEVICE WITH A ROUNDING RECODING CIRCUIT FOR PERFORMING HIGH SPEED ITERATIVE MULTIPLICATION

[75] Inventors: Akira Miyoshi; Takashi Taniguchi, both of Osaka, Japan

[73] Assignee: Matsushita Electric Industrial Co., Ltd., Osaka, Japan

[21] Appl. No.: 102,335

[22] Filed: Sep. 23, 1993

Related U.S. Application Data

[63] Continuation of Ser. No. 741,876, Aug. 7, 1991, Pat. No. 5,289,398.

[30] Foreign Application Priority Data

Aug. 7, 1990 [JP] Japan .................................. 2-210903

[51] Int. Cl.$^6$ .............................................. G06F 7/52
[52] U.S. Cl. ...................................... 364/754; 364/760
[58] Field of Search ............... 364/760, 759, 757, 754, 364/746.2

[56] References Cited

U.S. PATENT DOCUMENTS

| | | | |
|---|---|---|---|
| 4,807,175 | 2/1989 | Tokumaru et al. | 364/760 |
| 4,864,528 | 9/1989 | Nishiyama et al. | 364/754 |
| 4,868,777 | 9/1989 | Nishiyama et al. | 364/754 |
| 5,036,482 | 7/1991 | Saini | 364/760 |

*Primary Examiner*—Tan V. Mai
*Attorney, Agent, or Firm*—Lowe, Price, LeBlanc & Becker

[57] ABSTRACT

A multiplication processing device provided with a recoding circuit for dividing an M-digit number (M is a natural number), the radix of which is Y, into consecutive N-digit sets (N is a natural number equal to or less than M) and for calculating an intermediate sum $S_i$ and an intermediate carry $C_1$ according to $Z_{gi} = C_i \times Y^N + S_i$ ($Z_{gi}$ is the value of an ith set (i represents natural numbers equal to or greater than a predetermined number)) and for adding the intermediate sum $S_i$ corresponding to the ith set to an intermediate carry $C_{i-1}$ corresponding to an (i-1)th set for each value of i and a selection circuit for selecting one of one or more numbers having the same format as that of the intermediate carry $C_i$ corresponding to the ith set and for outputting the selected number to the recoding circuit as the intermediate carry $C_{i-1}$ corresponding to the (i-1)th set.

15 Claims, 13 Drawing Sheets

FIG. 4

Xi, Xi+1 : INPUT NUMBERS  
Qj : Xi+1="1"  
Qj-1 : Xi-1="1"  
Cj : INTERMEDIATE CARRY  
Sj : INTERMEDIATE SUM  
Bj : Cj+Qj  
Rj : Sj+Qj-1

| Xi+1 | Xi | Qj | Qj-1 | Cj | Sj | Bj | Rj |
|---|---|---|---|---|---|---|---|
| 1 | 1 | 1 | 1/0 | 1 | -1 | 1 | 0/-1 |
| 1 | 0 | 1 | 1/0 | 1/0 | -2/2 | 1/0 | -1/2 |
| 1 | -1 | 1 | 1/0 | 0 | 1 | 0 | 2/1 |
| 0 | 1 | 0 | 1/0 | 0 | 1 | 1 | 2/1 |
| 0 | 0 | 0 | 1/0 | 0 | 0 | 1 | 1/0 |
| 0 | -1 | 0 | 1/0 | 0 | -1 | 1 | 0/-1 |
| -1 | 1 | 0 | 1/0 | 0 | -1 | 1 | 0/-1 |
| -1 | 0 | 0 | 1/0 | 0/-1 | -2/2 | 1/0 | -1/2 |
| -1 | -1 | 0 | 1/0 | -1 | 1 | 0 | 2/1 |

FIG. 5

| Xi-1 | Xi-2 | Crj-1 | Qj-1 | Bj-1 |
|---|---|---|---|---|
| 1 | 1 | 1 | 1 | 1 |
| 1 | 0 | Xpi+Xmi | 1 | Xpi+Xmi |
| 1 | -1 | 0 | 1 | 0 |
| 0 | 1 | 0 | 0 | 1 |
| 0 | 0 | 0 | 0 | 1 |
| 0 | -1 | 0 | 0 | 1 |
| -1 | 1 | 0 | 0 | 1 |
| -1 | 0 | -(Xpi+Xmi) | 0 | $\overline{Xpi+Xmi}$ |
| -1 | -1 | -1 | 0 | 0 |

FIG. 11

REDUNDANT BINARY VALUE

| | B | 2-B | 3-B |
|---|---|---|---|
| 1 1. 1 | ------------ | ------------ | ------------ |
| 1 1. 0 | ------------ | ------------ | ------------ |
| 1 1. T | ------------ | ------------ | ------------ |
| 1 0. 1 | ------------ | ------------ | ------------ |
| 1 0. 0 | ------------ | ------------ | ------------ |
| 1 0. T | 1 0. T T T T ··· | 0 1. 0 T 1 1 ··· | 1 0. 0 T 1 1 ··· |
| 1 T. 1 | 1 T. 1 T T T ··· | 0 1. 0 T 1 1 ··· | 1 0. 0 T 1 1 ··· |
| | 1 T. 0 1 T T ··· | 0 1. 0 T 1 1 ··· | 1 0. 0 T 1 1 ··· |
| | 1 T. 0 0 1 T ··· | 0 1. 0 0 T 1 ··· | 1 0. 0 0 T 1 ··· |
| 1 T. 0 | 1 T. 0 0 0 0 ··· | 0 1. 0 0 0 0 ··· | 1 0. 0 0 0 0 ··· |
| | 1 T. 0 0 T 1 ··· | 0 1. 0 0 1 T ··· | 1 0. 0 0 1 T ··· |
| | 1 T. 0 T 1 1 ··· | 0 1. 0 1 T T ··· | 1 0. 0 1 T T ··· |
| 1 T. T | 1 T. T 1 1 1 ··· | 0 1. 0 1 T T ··· | 1 0. 0 1 T T ··· |
| 0 1. 1 | 0 1. 1 T T T ··· | 0 1. 0 T 1 1 ··· | 1 0. 0 T 1 1 ··· |
| | 0 1. 0 1 T T ··· | 0 1. 0 T 1 1 ··· | 1 0. 0 T 1 1 ··· |
| | 0 1. 0 0 1 T ··· | 0 1. 0 0 T 1 ··· | 1 0. 0 0 T 1 ··· |
| 0 1. 0 | 0 1. 0 0 0 0 ··· | 0 1. 0 0 0 0 ··· | 1 0. 0 0 0 0 ··· |
| | 0 1. 0 0 T 1 ··· | 0 1. 0 0 1 T ··· | 1 0. 0 0 1 T ··· |
| | 0 1. 0 T 1 1 ··· | 0 1. 0 1 T T ··· | 1 0. 0 1 T T ··· |
| 0 1. T | 0 1. T 1 1 1 ··· | 0 1. 0 1 T T ··· | 1 0. 0 1 T T ··· |
| 0 0. 1 | 0 0. 1 1 1 1 ··· | 0 1. 0 1 T T ··· | 1 0. 0 1 T T ··· |
| 0 0. 0 | ------------ | ------------ | ------------ |
| 0 0. T | ------------ | ------------ | ------------ |
| 0 T. 1 | ------------ | ------------ | ------------ |
| 0 T. 0 | ------------ | ------------ | ------------ |
| 0 T. T | ------------ | ------------ | ------------ |
| T 1. 1 | ------------ | ------------ | ------------ |
| T 1. 0 | ------------ | ------------ | ------------ |
| T 1. T | ------------ | ------------ | ------------ |
| T 0. 1 | ------------ | ------------ | ------------ |
| T 0. 0 | ------------ | ------------ | ------------ |
| T 0. T | 1 0. T T T T ··· | 0 1. 0 T 1 1 ··· | 1 0. 0 T 1 1 ··· |
| T T. 1 | 1 T. 1 T T T ··· | 0 1. 0 T 1 1 ··· | 1 0. 0 T 1 1 ··· |
| | 1 T. 0 1 T T ··· | 0 1. 0 T 1 1 ··· | 1 0. 0 T 1 1 ··· |
| | 1 T. 0 0 1 T ··· | 0 1. 0 0 T 1 ··· | 1 0. 0 0 T 1 ··· |
| T T. 0 | 1 T. 0 0 0 0 ··· | 0 1. 0 0 0 0 ··· | 1 0. 0 0 0 0 ··· |
| | 1 T. 0 0 T 1 ··· | 0 1. 0 0 1 T ··· | 1 0. 0 0 1 T ··· |
| | 1 T. 0 T 1 1 ··· | 0 1. 0 1 T T ··· | 1 0. 0 1 T T ··· |
| T T. T | 1 T. T 1 1 1 ··· | 0 1. 0 1 T T ··· | 1 0. 0 1 T T ··· |

T = -1

SMALL-SIZED, LOW POWER CONSUMPTION MULTIPLICATION PROCESSING DEVICE WITH A ROUNDING RECODING CIRCUIT FOR PERFORMING HIGH SPEED ITERATIVE MULTIPLICATION

This application is a continuation of application Ser. No. 07/741,876 filed Aug. 7, 1991, now U.S. Pat. No. 5,289,398.

BACKGROUND OF THE INVENTION

1. Field of The Invention

This invention generally relates to a high speed multiplication processing device suitable for large scale integration (LSI) thereof and more particularly to a multiplication processing device which generates partial products by recoding multipliers.

2. Description of The Related Art

First, it will be explained hereinbelow that a precision iterative multiplication can be achieved by rounding a result of a multiplication. Consider, for example, an iterative multiplication in which a result of a multiplication is used as an operand for the next multiplication. In this case, assuming that the number of digits of a multiplier which can be inputted to a multiplication processing device is n (representing a predetermined natural number), a result of a multiplication is represented by n or more digits. When the result of the multiplication is truncated to n digits and the thus obtained n-digit result of the multiplication is inputted to the device as an operand for the next multiplication, an error of less than 1 occurs in the inputted operand by comparison with the value which tile result of the multiplication had before the truncation. Incidentally, the weight of the least significant digit of the operand obtained as the result of the truncation is assumed to be 1. In contrast to this, when what is called a nearest approximation rounding operation is performed and thereafter a result thereof is inputted as an operand, an error becomes $\frac{1}{2}$ at most. This means that when a nearest approximation rounding operation is performed, the result of an iterative multiplication operation becomes more accurate than in case of truncating a result of a multiplication of the iterative multiplication operation and using the result of the truncation as an operand for the next multiplication thereof. Thereby, a precision iterative multiplication operation can be achieved. Hereinafter, a conventional iterative multiplication processing device for performing an iterative multiplication operation by effecting a rounding operation upon completion of each multiplication of the iterative multiplication operation will be described.

Referring to FIG. 9, there is illustrated the construction of the conventional iterative multiplication processing device for performing an iterative multiplication operation by effecting a rounding operation upon completion of each multiplication of the iterative multiplication operation. Reference numeral 901 indicates a selection latch; and 902, 903, 904 and 905 latches. The respective latches operate in response to two-phase clock signals ph1 and ph2. Reference numeral 906 represents a 2-bit Booth recoding circuit which divides a binary multiplier latched by the selection latch 901 from the feast significant bit thereof to the most significant bit thereof into 2-bit sets and then recodes each 2-bit set as a value of from −2 to 2. Reference numeral 907 indicates a partial-product-generating-and-adding circuit for generating and adding partial products by using values which are obtained by recoding the 2-bit sets (hereunder referred to as recoding values) and outputted from the 2-bit Booth recoding circuit 906 and for outputting the result of the addition in the form of, for example, a redundant binary intermediate result. Reference numeral 908 denotes a binary number converting circuit which converts a redundant binary number into a binary number. Reference numeral 909 represents a rounding circuit for rounding the result of the multiplication, which is converted by the binary number converting circuit 908, to a predetermined digit.

Consider a case that a multiplication expressed by, for instance, the following equation (1) is performed by using the multiplication processing device of FIG. 9.

$$P_n = P_{n-1} \times Q_{n-1} \quad (1)$$

First, $P_{n-1}$ is inputted to the selection latch 901 as a multiplier. Further, $Q_{n-1}$ is inputted to the latch 902 as a multiplicand. Then, the result of the multiplication expressed by the equation (1) is latched by the latch 903 as a redundant binary intermediate result. In the next cycle, this intermediate result is latched by the latch 904 and is converted by the binary number converting circuit 908 into a binary number. Thereafter, the binary intermediate result thus obtained is rounded by the rounding circuit 909 to a predetermined digit and the thus rounded intermediate result is inputted to the latch 905. Further, in the following cycle, the rounded intermediate result is inputted to the latch 901 and then the next multiplication $P_n \times Q_n$ is performed. At that time, data $Q_n$ has been latched by the latch 902.

Namely, the conventional iterative multiplication processing device which performs an iterative multiplication operation by effecting a rounding operation upon completion of each multiplication of the iterative multiplication operation, the binary number converting circuit 908 and the rounding circuit 909 are used when performing each multiplication.

Next, another conventional iterative multiplication processing device (hereunder referred to as a second conventional iterative multiplication processing device) for multiplying a multiplicand by a value obtained by subtracting a multiplier from a constant A and using the result of the multiplication as a multiplier for the next multiplication will be described hereinbelow. Referring to FIG. 10, there is illustrated the construction of the second conventional iterative multiplication processing device. Incidentally, in FIG. 10, like reference numerals designate like blocks or parts of FIG. 9. Reference numeral 1001 designates a subtracting circuit which subtracts a value selected by the selection latch 901 from the constant A.

Hereinafter, it will be described how an iterative multiplication operation of repeatedly effecting a multiplication expressed by the following equation (2) is performed by the multiplication processing circuit of FIG. 10.

$$P_n = (A - P_{n-1}) \times Q_{n-1} \quad (2)$$

In a first cycle, $P_{n-1}$ is inputted to the selection latch 901 as a multiplier. Then, a subtraction $(A - P_{n-1})$ is performed by the subtracting circuit 1001 and the result of the subtraction is inputted to the 2-bit Booth recoding circuit 906. On the other hand, $Q_{n-1}$ is inputted to the latch 902 as a multiplicand. Subsequently, partial products are generated and added by using a value obtained by recoding the multiplier. Thus, for example, a redundant binary intermediate result is generated. This intermediate result is latched by the latch 903. In a second cycle, this intermediate result is latched by the latch 904 and is then converted by the binary number converting circuit 908 into a binary number. Subsequently, a binary result of the multiplication $((A-P_{n-1}) \times Q_{n-1})$ is latched by the latch 905. In a third cycle, the selection latch 901 selects the result of the multiplication effected in the last cycle (namely, in the second cycle) and performs a multiplication similarly as in the first cycle. Thereafter, operations effected in the second and third cycles are repeated and a binary result of the multiplication is outputted in an mth cycle (incidentally, m is an even positive integer).

As described above, in the second conventional iterative multiplication processing device for performing an iterative multiplication operation by multiplying a value obtained by subtracting the multiplier from the constant A by the multiplicand in each stage thereof and using the result of the multiplication as a multiplier for the next multiplication, a subtraction circuit for subtracting a multiplier from the constant at each multiplication.

Turning to FIG. 13, there is illustrated the construction of still another conventional iterative multiplication processing device (hereunder referred to as a third conventional iterative multiplication processing device) for multiplying a value resulted from subtracting a redundant binary intermediate product, which is obtained by the multiplication in the last cycle (namely, the cycle directly before the present cycle) from a constant, by a multiplicand. Reference numeral 1301 represents a selection circuit which selects a redundant binary number and a multiplier and latches them in response to a clock signal ph1. Reference numerals 1302, 1303, 1304 and 1305 designate latches which operate in response to clock signals ph1 and ph2. Reference numeral 1306 denotes a partial product generating circuit which generates and adds partial products from output values of a redundant binary 2-bit Booth recoding circuit 1307 and outputs of the latches 1302. The redundant binary 2-bit Booth recoding circuit 1307 partitions an output value of the redundant binary addition circuit 1301 from the least significant digit to the most significant digit thereof into 2-digit groups and then recodes each of the 2-digit groups into a value of from −2 to 2. Reference numeral 1308 represents a binary number converting circuit which converts a redundant binary intermediate product outputted from the latch 1304 into a binary result of the multiplication. Reference numeral 1309 designates a rounding circuit which rounds and normalizes the result of the multiplication outputted from the binary conversion circuit 1308. Reference numeral 1310 indicates a redundant binary number subtracting circuit which performs the redundant binary addition of a redundant binary value latched by the selection latch 1301 to a predetermined constant A. Incidentally, when a binary number is inputted to the redundant binary addition circuit 1310, the device is adapted to set the constant A as 0.

Next, an operation of multiplying by a multiplicand by a value obtained by subtracting a redundant binary intermediate product from a predetermined constant A, which is effected by using the multiplication processing device of FIG. 13, will be described hereinbelow. In the equation (2), $P_{n-1}$ is a redundant binary intermediate result obtained as a result of a multiplication effected in the cycle directly before the present cycle. This intermediate result is inputted from the latch 1301 to the redundant binary number subtracting circuit 1310. Simultaneously, the constant A is inputted to the redundant binary number subtracting circuit 1310 as another input value thereof. Then, the term $(A - P_{n-1})$ of the equation (2) is calculated. Moreover, simultaneously, a multiplicand $Q_{n-1}$ is inputted to the latch 1302 and subsequently the multiplication $(A-P_{n-1}) \times Q_{n-1}$ is effected.

Thus, in case of the above described conventional iterative multiplication processing device which effects a multiplication in each cycle by using the result of the multiplication obtained in the cycle directly before the present cycle, the redundant binary number subtracting circuit for subtracting the result of the multiplication effected in the cycle directly before the preset cycle from the constant A is required. Therefore, the third conventional iterative multiplication processing device has drawbacks that a multiplication execution rate becomes small and that the size of hardware becomes large.

In cases of the first to third conventional devices, the intermediate result is represented as a redundant binary number which is a kind of signed digital data. However, a multiplication circuit outputting an intermediate result by retaining or saving a carry and an iterative multiplication circuit using a high radix have the construction similar to that of the first, second or third conventional device.

As above described, the conventional iterative multiplication processing circuit, which performs a rounding operation on completion of each multiplication, (namely, the first conventional iterative multiplication processing circuit) should convert the intermediate result to binary data by using the binary number converting circuit and should then round the converted binary data by using the rounding circuit. Thus, the first conventional iterative multiplication processing circuit has defects that an iterative-multiplication execution rate is small, that the circuit size thereof becomes large and that power consumption becomes increased.

Moreover, the conventional iterative multiplication processing device, which multiplies a multiplicand by a value obtained by subtracting a multiplier from a constant A and using the result of the multiplication as a multiplier for the next multiplication, (namely, the second conventional iterative multiplication processing device) should subtract the result of the multiplication from the constant. Therefore, the second conventional iterative multiplication processing circuit has similar drawbacks that an iterative-multiplication execution rate becomes small, that the circuit size thereof becomes large and that power consumption becomes increased.

The present invention is accomplished to eliminate the defects of the conventional devices.

It is accordingly an object of the present invention to provide a multiplication processing device which can perform an iterative multiplication operation at a high speed and has a small-sized circuit and small power consumption and is suitable for an iterative multiplication.

SUMMARY OF THE INVENTION

To achieve the foregoing object and in accordance with a first aspect of the present invention, there is provided a multiplication processing device which comprises recoding circuit means for dividing an M- digit number (M is a natural number), the radix of which is Y, into consecutive N-digit sets (N is a natural number equal to or less than M) and for calculating an intermediate sum $S_i$ and an intermediate carry $C_i$ according to $Z_{gi} = C_i \times Y^N + S_i$, ($Z_{gi}$ is the value of an ith set (i represents natural numbers equal to or greater than a predetermined number)) and for adding the intermediate sum $S_i$ corresponding to the ith set to an intermediate carry $C_{i-1}$ corresponding to the next lower order set, namely, an (i−1)th set for each value of i and selection circuit means for selecting one of one or more numbers having the same format as that of the intermediate carry $C_i$ corresponding to the ith set and for outputting the selected number to the recoding circuit means as the intermediate carry $C_{i-1}$ corresponding to the (i−1)th set.

Incidentally, for brevity, in the instant application the term "digit place" (namely, "digit position") is sometimes more simply referred to as "digit". Additionally, the term "digit place" is generally defined as each site in a positional representation system that may be identified by an ordinal number or by an equivalent identifier and that may be occupied by a character. Therefore, expressions such as "M-digit" are used to mean that the number of digit places (or digit positions) of a number represented by employing a positional notation or representation is M. Further, expressions such as "N-digit set" are used to represent a set or number consisting of N digits.

Further, in accordance with a second aspect of the present invention, there is provided a multiplication processing device having a first latch for inputting a multiplier, and a partial product generating and adding circuit, the multiplication processing device comprising: a carry generating circuit connected to the first latch, the carry generating circuit having selection circuit means for selecting one of a constant number and a variable number and for outputting the number selected thereby, wherein the constant number and the variable number have a same format; a multiplier recording circuit and to the partial product generating and adding circuit, the multiplier recording circuit having: first means for receiving signed digit data, the radix of which is 2, from the first latch and for dividing the received signed digit data, into the 2-digit sets and for calculating an intermediate sum $S_i$ and an intermediate carry $C_i$ from the value $Z_{gi}$ of the ith set wherein $Z_{gi}$ is given by $$Z_{gi} = 4 \times C_i + S_i$$

where i represents natural numbers equal to or greater than a predetermined number L) and calculating a secondary intermediate sum $R_i$ and a secondary intermediate carry B, corresponding to the ith set given by $$R_i = S_i + Q_{i-1}$$

and $$B_i = C_i + \overline{Q_i}$$

by using a signal Q, representing the information indicating whether a value at a higher-order digit of the ith set is 1, by inputting a signal $Q_{L-1}$ corresponding to an (L−1)th set from the selection circuit means and by also using another signal $Q_{i-1}$ corresponding to an (i−1)th set, and second means for calculating a recoded value $Z_i$ given by $$Z_i = C_{i-1} + S_i = B_{i-1} + R_{i-1}$$

by using the secondary intermediate sum $R_i$, by inputting the selecting number from the selection circuit means as the secondary intermediate carry $B_{L-1}$ corresponding to the (L−1)th set and using the secondary intermediate carry $B_{i-1}$ corresponding to the (i−1)th set.

Moreover, in accordance with a third aspect of the present invention, there is provided a multiplication processing device which comprises recoding circuit means for recoding a multiplier and recoding data setting means for subtracting a value B represented by using a redundant binary number, which is equal to $Bb \pm \alpha \cdot 2^{-k}$ (Bb is represented by a binary number having a non-zero value at a digit of which the order is equal to or higher than that corresponding to $2^{-j}$; $(\frac{1}{2}) \leq \alpha < 1$; and i, j<k) if converted into a binary number, from a predetermined constant A represented by a binary number which has a non-zero value at a digit of which the order is equal to or higher than that corresponding to $2^{-i}$ and for outputting the result of the subtraction to the recoding circuit means, wherein said recoding data setting means sets (A−Bb) at each of from the most significant digit of the result of the subtraction to a digit corresponding thereof to $2^{-L}$ (incidentally, L denotes the maximum value of i and j) and sets 0 at each of from a digit thereof corresponding to $2^{-(L+1)}$ to a digit thereof corresponding to $-(L+m)$ ($1 \leq m < k - L$) and sets a value, which is obtained by inverting the sign of a value set at a digit of the value B corresponding to $2^{-(L+m+1)}$, at a digit of the result of the subtraction corresponding to $2^{-(L+m+1)}$ if a value set at a digit of the value B corresponding to $2^{-(L+m)}$ is 0 and sets the value, which is set at the digit of the value B corresponding to $2^{-(L+m+1)}$, at the digit of the result of the subtraction corresponding to $2^{+(L+m+1)}$ if the value set at the digit of the value B corresponding to $2^{-(L+m)}$ is other than 0 and sets the values, which are respectively obtained by inverting the signs of the values set at the digits of the value B corresponding to values equal to and less than $2^{-(L+m+2)}$, at digits of the result of the subtraction corresponding to values equal to and less than $2^{-(L+m+2)}$ and outputs the set value of the result of the subtraction to the recoding circuit means.

Furthermore, in accordance with a fourth aspect of the present invention, there is provided a multiplication processing device which comprises first means for selecting a first part represented by digits, the orders of which are higher than first decimal place, of an input number and a constant and for outputting the selected first part of the input number and the constant, second means for inverting the sign of a second part represented by digits, the orders of which are equal to and lower than third decimal place, of the input number and for outputting the second part of the input number having the inverted sign, third means for inverting the sign of a value represented by second decimal place of the input number and then outputting the value represented by the second decimal place having the inverted sign if a value held at the first decimal place is 0 and for outputting a value represented by tile second decimal place of the input number if the value held at the first decimal place is other than 0 and recoding circuit means capable of inputting the values outputted from the first, second and third means. Incidentally, the term "a decimal place" does not represent a decimal point but designates one of the digits following the decimal point in a decimal fraction. For example, the "first decimal place" corresponds to $10^{-1}$. Thus, the expression "digits, the orders of which are higher than first decimal place" represents the digits preceding the decimal point. Further, the expression "digits, the orders of which are lower than first decimal place" denotes digits following the first decimal place.

Thus, in the multiplication processing circuit of the present invention, a recoding circuit inputs an input number, as well as a value selected by the selection circuit as a carry from a lower order recoding circuit, and adds the input number and the carry from the lower order recoding circuit and recodes the result of the addition. Thereby, in the multiplication processing device of the present invention, a multiplication of a multiplicand by the result of the addition of the input number and the carry from the lower order recoding circuit is performed. Further, a value to be obtained by subtracting a value of a constant B from another constant A can be easily set by the multiplication processing device as above constructed.

Further, by selecting a value in accordance with the format of a carry and inputting the selected value to a recoding circuit as a carry from the next lower order digit, the multiplication processing device of the present invention has the following effects.

(1) In an iterative multiplication operation in which a rounding of the result of each multiplication is effected, the multiplication processing device of the present invention can save using a binary number converting circuit and a rounding circuit upon completion of each multiplication. Consequently, an iterative multiplication can be effected at a high speed with small-sized hardware and low power consumption.

(2) Similarly, in an iterative multiplication operation in which a value obtained by subtracting a multiplier from a constant A is multiplied by a multiplicand and the result of the multiplication is employed as a multiplier to be used in the next multiplication, the multiplication processing device can save using a subtraction circuit which subtracts a multiplier from the constant A in each multiplication. Consequently, an iterative multiplication can be effected at a high speed with small-sized hardware and low power consumption.

Further, in the case of (2), when an intermediate product obtained in a multiplication is inputted as a multiplier for the next multiplication, the multiplication processing device can save using a subtraction circuit which subtracts a multiplier (namely, an intermediate product) from the constant A in each multiplication. Thus, an iterative multiplication can be effected at a high speed with small-sized hardware and low power consumption.

Moreover, in case of constructing a basic unit of a redundant binary 2-bit Booth recoding circuit, the logical design of the basic unit is performed by replacing an intermediate sum $S_i$ and an intermediate carry $C_i$ with a secondary intermediate sum $R_i$ and a secondary intermediate carry $B_i$ by using a signal $Q_i$ indicating the information of the possibility of an intermediate carry $C_i$. Thereby, a redundant binary 2-bit Booth recoding circuit which has a small number of transistors and low power consumption can be constructed.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 4 is a truth table for illustrating an operation of a basic unit 301 of the redundant binary 2-bit Booth recoding circuit of FIG. 3;

FIG. 5 is a truth table for illustrating an operation of the rounding carry generating circuit 303 of FIG. 3;

FIG. 11 is a diagram for illustrating resultant redundant binary values obtained by calculating $(2-B)$ and $(3-B)$ by using a redundant binary value B which is nearly 1;

DETAILED DESCRIPTION OF THE PREFERRED EMBODIMENTS

Hereinafter, preferred embodiments of the present invention will be described in detail by referring to the accompanying drawings.

First, an outline of an iterative multiplication processing device in which a recoding circuit rounds an intermediate result on completion of each multiplication embodying the present invention will be described hereinbelow.

Figure 1:
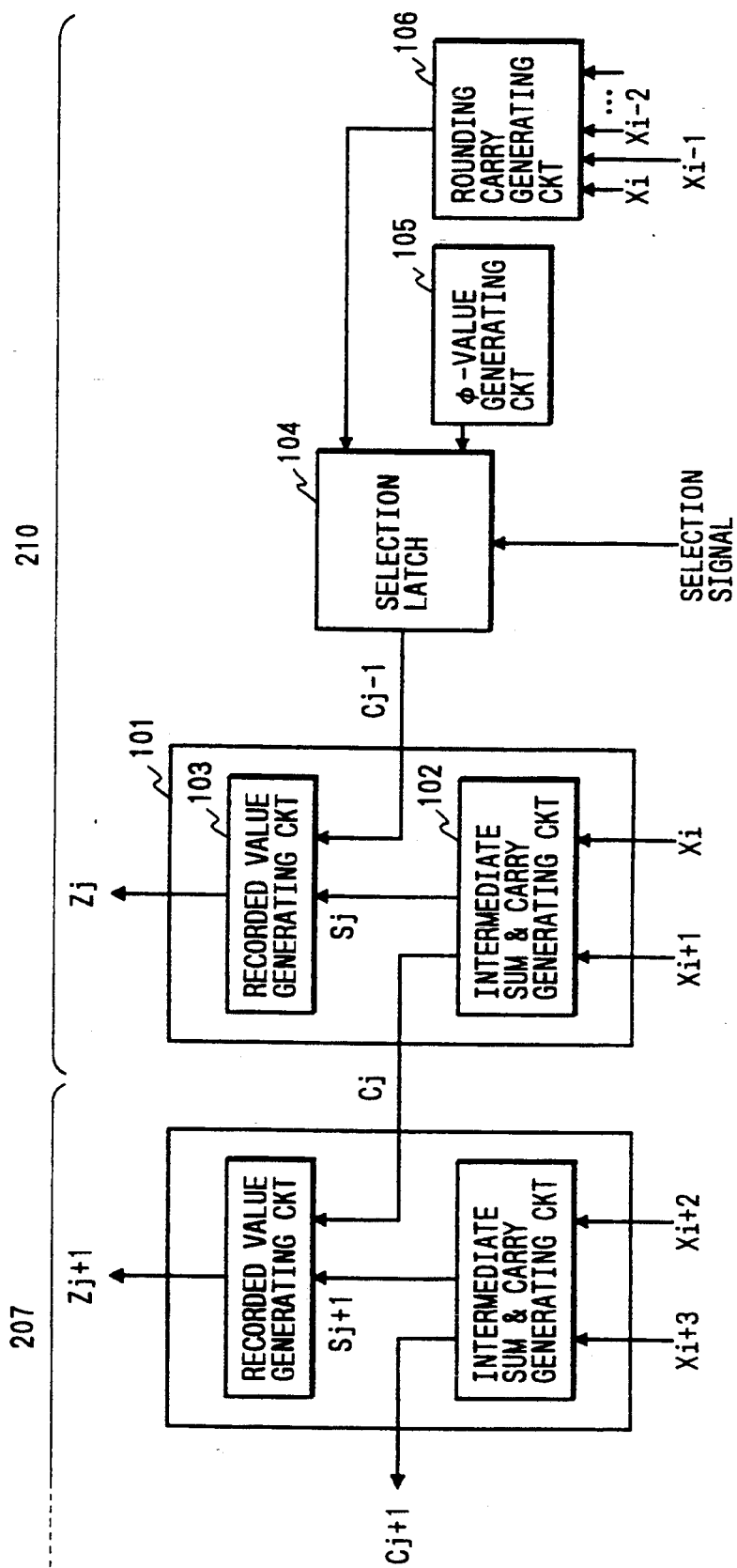
FIG. 1 is a schematic block diagram for illustrating a multiplier recoding circuit and a carry generating circuit of an embodiment of the present invention.

FIG. 1 is a schematic block diagram for illustrating a multiplier recoding circuit and a carry generating circuit of an embodiment of the present invention in case where an intermediate result X of a multiplication is inputted as a multiplier for the next multiplication. A basic unit 101 of a multiplier recoding circuit divides a multiplier X into 2-digit sets and recodes each of the 2-digit sets. Further, the basic unit 101 is composed of an intermediate-sum-and-intermediate-carry generating circuit 102 and a recoded value generating circuit 103. The circuit 102 calculates an intermediate sum and carry corresponding to each 2-bit set obtained by dividing the input number X, for instance, a jth intermediate sum $S_j$ and a jth intermediate carry $C_j$ corresponding to a jth 2-digit set, the respective digit of which are $X_{i+1}$ and $X_i$ (namely, an (i+1)th and ith digits of the input number X), from the following equation giving the relation among the value $Zg_j$ of the jth set:

$$Zg_j = 2^2 \times C_j + S_j = 2X_{i+1} + X_i.$$

Further, the recoded value generating circuit 103 generates a recoded value $Z_j$ by adding the intermediate sum $S_j$ and a carry $C_{j-1}$ corresponding to the next lower order set (namely, an (i−1)th set). A selection circuit 104 selects a value corresponding to $C_j = 0$ outputted from a 0-value generating circuit 105 and a carry outputted from a rounding carry generating circuit 106. The 0-value generating circuit 105 generates a value corresponding to an intermediate carry $C_{j-1}$ (=0) to be inputted to the recoding circuit 101. The rounding carry generating circuit 106 generates a carry caused due to a rounding by using values ($X_i$, $X_{i-1}$, $X_{i-2}$, . . . ) of digits having orders equal to and lower than i corresponding to $X_i$.

Figure 2:
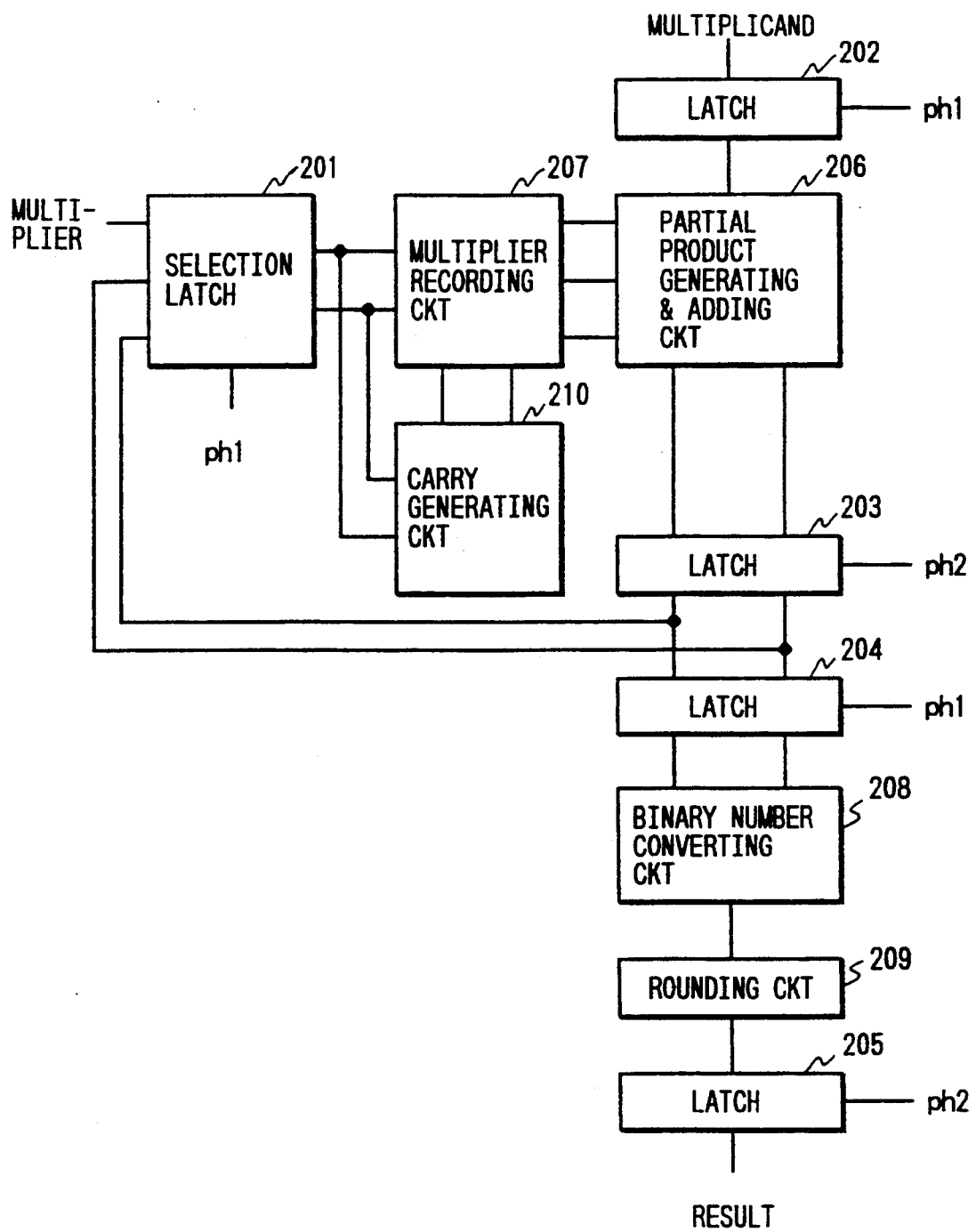
FIG. 2 is a schematic block diagram for illustrating a redundant binary iterative multiplication processing device according to the present invention.

FIG. 2 is a schematic block diagram for showing an iterative multiplication circuit employing the circuits of FIG. 1. Reference numeral 201 designates a selection latch; and 202, 203, 204 and 205 latches. The respective latches operate in response to two-phase clock signals ph1 and ph2. Reference numerals 207 and 210 indicate corresponding circuit portions of FIG. 1. Reference numeral 206 designates a partial product generating and adding circuit which generates and adds partial products by using a multiplicand latched by the latch 202 and a recoded value outputted from the multiplier recoding circuit 207 and outputs the result as an intermediate result which is represented by using a redundant binary number or by using two binary numbers. Reference numeral 208 denotes a binary number converting circuit which converts the intermediate result to a binary number. Further, reference numeral 209 designates a rounding circuit for rounding the result of the multiplication, which is converted by the binary number converting circuit 208 into the binary number, to a predetermined digit (hereunder referred to as a rounding digit).

Next, an iterative multiplication operation of iteratively performing a multiplication expressed by the equation (1), which is effected by using the circuits of FIGS. 1 and 2, will be described hereinbelow. First, $P_{n-1}$ is inputted to the selection latch 201 as a multiplier, and $Q_{-1}$ is inputted to the latch 202 as a multiplicand. Such input data for calculating the equation (1) are respectively inputted to the multiplier recoding circuit 207 and the partial product generating and adding circuit 206, and the result of the calculation is inputted to the latch 203 as an intermediate result. At that time, the recoding circuit 207 selects and outputs an output value of the 0-value generating circuit 105 as a carry from the next lower order digit. In the next cycle, the intermediate result $P_{n-1} \times Q_{n-1}$ is latched by the selection circuit 201 and is then recoded in the multiplier recoding circuit 207. At that time, the selection circuit 104 provided in the multiplier recoding circuit 207 selects an output value of the rounding carry generating circuit 106 as a carry from the next lower order digit. Thereby, in the recoding circuit 207, an addition of a carry caused due to a rounding and a value represented by digits of the orders higher than that of the rounding digit is performed. Namely, the intermediate result $P_{n-1} \times Q_{n-1}$ is recoded and simultaneously is rounded when inputted to the multiplier recoding circuit 207. Further, simultaneously, $Q_n$ is inputted to the latch 202, and then the next multiplication $P_n \times Q_n$ is effected. Moreover, when a binary final result is obtained after the iterative multiplication is performed some times, the intermediate result is inputted to the latch 204. Then, the intermediate result is rounded by the rounding circuit 209 after conversion in the binary number converting circuit 208. Thus, the binary result is obtained.

As above described, in the multiplication processing device of the present invention, an iterative multiplication operation is performed at a high speed by using an intermediate result of each multiplication and additionally rounding the intermediate result by using the multiplier recoding circuit.

Next, a first embodiment of the present invention will be described by referring to FIG. 3 which is a logic diagram for illustrating a redundant binary 2-bit Booth recoding circuit of this embodiment of the present invention in a case where input data is redundant binary number. Here, it is assumed that a redundant binary value X held at each digit is coded by using 2 bits (Xp, Xm) as described in Table 1.

TABLE 1

| X | Xp | Xm |
|---|----|----|
| 1 | 1 | 0 |
| 0 | 0 | 0 |
| −1 | 0 | 1 |
| inh. | 1 | 1 | inh.: inhibited

Incidentally, in Table 1, the use of the combination of Xp and Xm, each of which is 1, is inhibited. A basic unit 301 of the redundant binary 2-bit Booth recoding circuit inputs consecutive 2-digit redundant binary numbers and recodes each of the inputted numbers to a value of from −2 to 2. A selection circuit 302 selects one of two input signals. A rounding carry generating circuit 303 generates a carry due to a rounding by using input data. A 0-value generating circuit 304 generates $\overline{B_{j-1}}$, $\overline{Q_{j-1}}$ by which a carry to the basic unit 301 of the redundant binary 2-bit Booth recoding circuit from the next lower order digit becomes 0. Namely, in the embodiment of FIG. 3, a carry caused due to a rounding of the input value X to the digit corresponding to Xi coded by using the combination of $Xp_i$ and $Xm_i$ (namely, an output value of the rounding carry generating circuit 303) or 0 (namely, an output value of the 0-value generating circuit 304) is selected by using the selection circuit 302 as the carry from the next lower order digit and the selected value is inputted to the basic unit 301 of the redundant binary 2-bit Booth recoding circuit. Hereinafter, each of the above described composing portions of the iterative multiplication processing device of the present invention will be described in detail.

Figure 3:
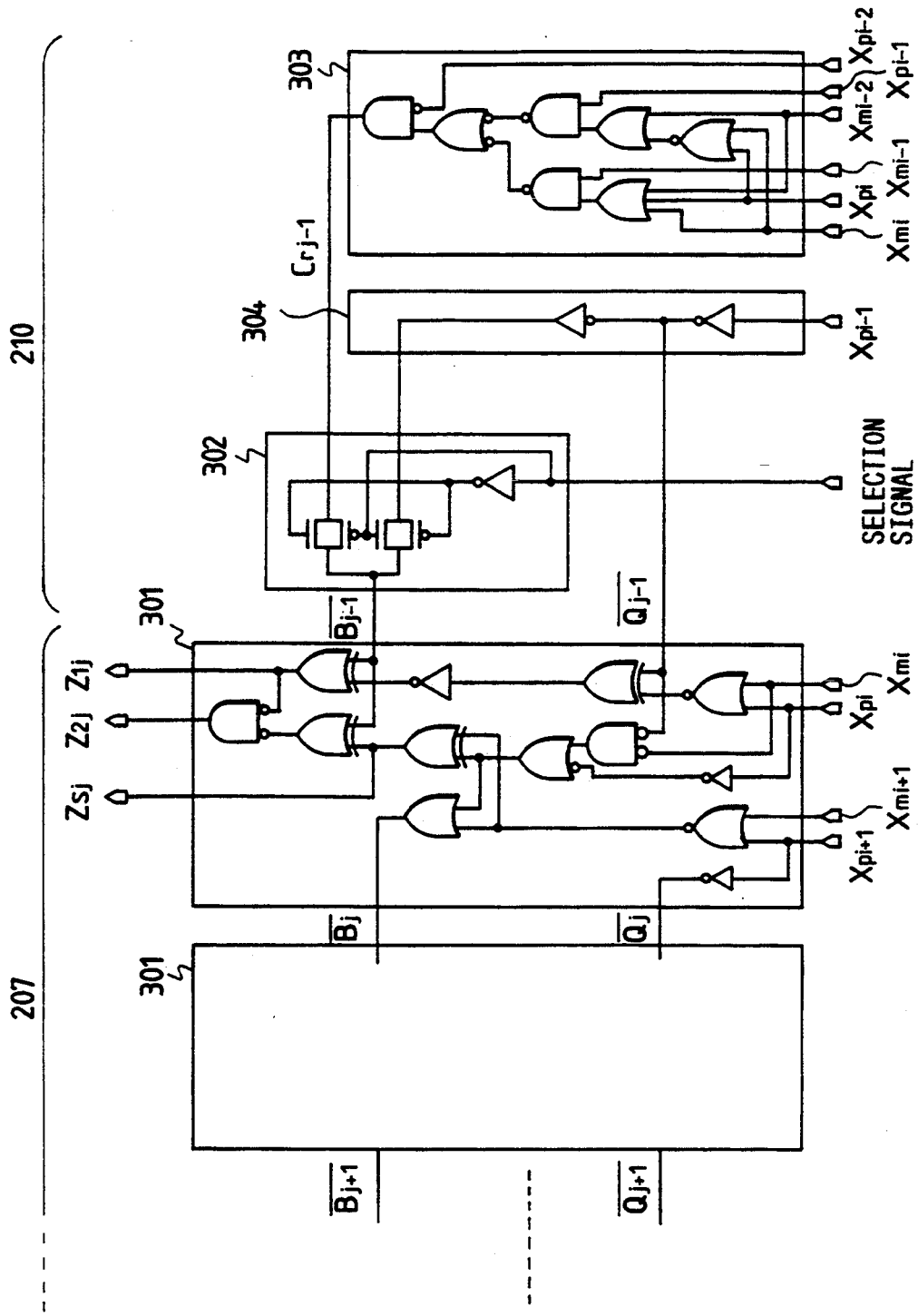
FIG. 3 is a logic diagram for illustrating a redundant binary 2-bit Booth recoding circuit and a carry generating circuit of another embodiment of the present invention.

A truth table to be used for constructing the basic unit 301 of the redundant binary 2-bit Booth recoding circuit of FIG. 3 is shown in FIG. 4. In this table, $X_i$ and $X_{i+1}$ designates values held at digits of the input value X corresponding to $2^i$ and $2^{i+1}$, respectively. A set consisting of $X_i$ and $X_{i+1}$ is referred to as a jth set. A value of this jth set is assumed to be $Z_{oj}$.

A first means for recoding calculates an intermediate carry $C_j$ from the jth set and an intermediate sum $S_j$ corresponding to the Jth set. Incidentally, it is assumed that the value of $C_j$ varies from −1 to 1 and that the value of $S_j$ ranges from −2 to 2. Thus, The relation among $Z_{oj}$, $C_j$ and $S_j$ is obtained by the equation (3) described below.

$$Z_{oj} = 2X_{i+1} + X_i \qquad (3)$$
$$= 2^2 \times C_j + S_j$$
$$= 4 \times C_j + S_j$$

For example, in case that $Z_{oj}=3$ (namely, $X_{i+1}$, $X_i$)=(1, 1)), the intermediate carry $C_j$ and the intermediate sum $S_j$ are obtained as follows:

$$(C_j, S_j)=(1, -1).$$

However, in case that $Z_{oj}=2$ (namely, $(X_{i+1}, X_i)=(1, 0)$) or $Z_{oj}=-2$ (namely, $(X_{i+1}, X_i)=(-1, 0)$), there are two combinations of the values of the intermediate carry $C_j$ and the intermediate sum $S_j$ (namely, the combination of the values of $C_j$ and $S_j$ is not uniquely determined as in case that $Z_{oj}=2$ or $Z_{oj}=-2$). In this case, the combination of $C_j$ and $S_j$ to be employed is determined on the basis of information on the carry from the next lower order set. Namely, a signal $Q_j$ indicates that the value $X_{i+1}$ at a high-order digit of the jth set is 1. As is seen from FIG. 4, the intermediate carry $C_j$ sent from the jth set to the next higher order set is 1 or 0 if $Q_j=1$. Further, if $Q_j=0$, C. is 0 or −1. For instance, in case that $Z_{oj}=-2$ (namely, $(X_{i+1}, X_i)=(-1, 0)$), there are generally two combinations of the values of $C_j$ and $S_j$, namely, $(C_j, S_j)=(0, -2)$ or $(-1, 2)$. However, in case that $Q_{j-1}=1$, $C_{j-1}=0$ or 1. Thus, the former combination of the values of $C_j$ and $S_j$ in which $S_j$ is negative (namely, $(C_j, S_j)=(0, -2)$) is employed. Thereby, the result of an addition $(C_{j-1}+S_j)$ becomes within the range of the value of from −2 to 2. In this manner, the combinations of the values of $C_j$ and $S_j$ are determined in all cases by using the signal $Q_{j-i}$ corresponding to the next lower order set.

However, 2 bits are required for representing $C_j$ which ranges from −1 to 1, and 3 bits are required for representing $S_j$ which ranges from −2 to 2. This results in that the construction of the circuits becomes complex. In order to simplify the construction of the circuits, $B_j$ and $R_j$ are used instead of the intermediate carry $C_j$ and the intermediate sum $S_j$, respectively, as expressed by the following equations (4).

$$b_j = C_j + \overline{Q_j}$$

$$R_j = S_j + Q_{j-1} \qquad (4)$$

When calculating $B_j$ and $R_j$ from the equations (4), $B_j$ is obtained as 0 or 1, and $R_j$ is obtained as 2, 1, 0 or −1. Thus, $B_j$ is represented by 1 bit and $R_j$ is represented by 2 bits. Consequently, the construction of the circuits becomes simpler in comparison with $C_j$ and $S_j$. Here, $R_j$ is coded by using $R1_j$ and $R2_j$ as shown in Table 2.

TABLE 2

| $R_j$ | $R1_j$ | $R2_j$ |
|---|---|---|
| 2 | 0 | 0 |
| 1 | 0 | 1 |
| 0 | 1 | 1 |
| −1 | 1 | 0 |

Thus, $B_j$, $R1_j$, $R2_j$ and $Q_j$ are obtained as follows from the truth table of FIG. 4. Hereunder, a symbol ⊙ designates an EXCLUSIVE-OR operation.

$$B_j = \overline{Xp_{i+1}+Xm_{i+1}} + Xp_i + Q_{j-1} \cdot \overline{Xm_i} \qquad (5)$$

$$R1_j = \overline{(Xp_{i+1}+X_{i+1})} \odot (Xp_i + \overline{Xm_i} \cdot Q_{j-1}) \qquad (6)$$

$$R2_j = \overline{(Xp_i + Xm_i)} \odot Q_{j-1} \qquad (7)$$

$$Q_j = Xp_{i+1} \qquad (8)$$

Next, second means for recoding performs an addition of an intermediate sum $S_j$ corresponding to each set and a carry $C_{j-1}$ from the next lower order set. The value of the jth set after the recoding is given by the following equation (9) obtained by using the equation (4):

$$Z_j = C_{j-1} + S_j \qquad (9)$$
$$= B_{j-1} + R_j - 1$$

Further, the relation among $Z_j$, $B_{j-1}$ and $R_j$ obtained from the equation (9) is shown in Table 3 listed below.

TABLE 3

| $B_{j-1}$ | $R_j$ | $Z_j$ |
|---|---|---|
| 0 | 2 | 1 |
| 1 | 2 | 2 |
| 0 | 1 | 0 |
| 1 | 1 | 1 |
| 0 | 0 | −1 |
| 1 | 0 | −0 |
| 0 | −1 | −2 |
| 1 | −1 | −1 |

As is seen from Table 3, $Z_j$ ranges from −2 to 2. Thus, $Z_j$ is represented by 3 bits. Namely, $Z_j$ is represented by 3 bits $Z_{sj}$, $Z1_j$ and $Z2_j$ and coded as shown in Table 4 listed below.

TABLE 4

| $Z_j$ | $Z_{sj}$ | $Z1_j$ | $Z2_j$ |
|---|---|---|---|
| 2 | 0 | 0 | 1 |
| 1 | 0 | 1 | 0 |
| 0 | 0 | 0 | 0 |
| −0 | 1 | 0 | 0 |
| −1 | 1 | 1 | 0 |
| −2 | 1 | 0 | 1 |

$Z1_j$ indicates that the absolute value of $Z_j$ is 1; $Z2_j$ indicates that the absolute value of $Z_j$ is 2; and $Z_{sj}$ represents the sign of $Z_j$. Thus, the value of the jth set after the recoding $Z_j$ (namely, corresponding $Z1_j$, $Z2_j$ and $Z_{sj}$) is further represented by using $B_{j-1}$ and $R_j$, which is coded by using $R1_j$ and $R2_j$, as the following equation (10).

$$Z1_j = B_{j-1} \odot R2_j$$

$$Z2_j = (R1_j \odot B_{j-1}) \cdot (B_{j-1} \odot R2_j)$$

$$Zs_j = R1_j \quad (10)$$

The basic unit 301 of the redundant binary 2-bit Booth recoding circuit of FIG. 3 is constructed by using the equations (5), (6), (7), (8) and (10).

As above stated, in case of the basic unit 301 of the redundant binary 2-bit Booth recoding circuit of FIG. 3, the first means generates the intermediate sum $S_j$ (thus, $R_j$) and the intermediate carry $C_j$ (thus, $B_j$) according to information on the carry from the next lower order set, which is represented by the signal $Q_{j-1}$, and the second means performs the addition of the intermediate carry from the next lower order set $C_{j-1}$ (thus, $B_{j-1}$) and the intermediate sum $S_j$ (thus, $R_j$), thereby obtaining the recoded value of a set. Namely, when a rounding carry caused-due to a rounding is inputted as the intermediate carry from the next lower order set $C_{j-1}$ (thus, $B_{j-1}$) in the second means, the rounding carry is inputted to the basic unit 301 of the redundant binary 2-bit Booth recoding circuit as a rounded multiplier.

Next, the rounding carry generating circuit 303 will be described hereinbelow. Here, it is assumed that the rounding to nearest mode according to IEEE (Institute of Electrical and Electronics Engineers) 754 Standard is performed. When the input value X is rounded to a digit corresponding to $2^i$, the relation between the rounding carry and the input value according to IEEE 754 Standard becomes as illustrated in FIG. 5. Here, $X_i$ and $X_{i-1}$ represent redundant binary values held at digits of the input value X corresponding to $2^i$ and $2^{i-1}$, respectively. Further, $X_{i-2}$ is a redundant binary value held at what is called a "sticky digit" and indicates whether a value held at digits of which the orders are lower than a digit corresponding to $2^{i-2}$ is positive, negative or 0. If positive, $X_{i-2}=1$. If negative, $X_{i-2}=-1$. If zero, $X_{i-2}=0$. Moreover, $Cr_{j-1}$ represents a carry from the digit of $X_{i-1}$ to the digit of $X_i$, which is generated when the input value X is rounded by using $X_{i-1}$ and $X_{i-2}$. In case where the weight of the digit corresponding to $X_i$ is 1, the carry $Cr_{j-1}$ due to the rounding to nearest is determined by comparing the weight of digits, of which the orders are lower than that of the digit corresponding to $X_i$, with the weight of the digit corresponding to $X_i$, according to IEEE 754 Standard, as follows.

In case where the weight of digits, of which the orders are lower than that of the digit corresponding to $X_i$, is greater than ($\frac{1}{2}$), $Cr_{j-1}=1$.

Further, in case where the weight of digits, of which the orders are lower than that of the digit corresponding to $X_i$, is less than ($\frac{1}{2}$) and greater than ($-\frac{1}{2}$), $Cr_{j-1}=0$.

Moreover, in case where the weight of digits, of which the orders are lower than that of the digit corresponding to $X_i$, is less than ($-\frac{1}{2}$), $Cr_{j-1}=-1$.

Incidentally, in case where the weight of digits, of which the orders are lower than that of the digit corresponding to $X_i$, is equal to ($\frac{1}{2}$) or ($-\frac{1}{2}$), $Cr_{j-1}$ is determined such that the input value rounded to the digit corresponding to $X_i$ becomes equal to the nearest even number. For example, when the values of $X_{i-1}$ and $X_{i-2}$ are $-1$ and 0, respectively (hereunder such a relation is described as $(X_{i-1}, X_{1-2})=(-1, 0)$), the weight of digits, of which the orders are lower than that of the digit corresponding to $X_i$, is equal to $(-\frac{1}{2})$. Thus, in case that $X_i=1$, $Cr_{j-1}$ is set as $-1$ (namely, $Cr_{j-1}=-1$). Further, in case that $X_i=0$, $Cr_{j-1}$ is set as 0 (namely, $Cr_{j-1}=0$). Moreover, in case that $X_i=-1$, $Cr_{j-1}$ is set as $-1$ (namely, $Cr_{j-1}=-1$). Namely, according to the redundant binary coding rule shown in Table 1, $Cr_{j-1}=-(Xp_i+Xm_i)$. In other cases, $Cr_{j-1}$ can be obtained according to the redundant binary coding rule.

Next, the rounding carry $Cr_{j-1}$ is coded to be inputted to the basic unit 301 of the redundant binary 2-bit Booth recoding circuit as a carry $C_{j-1}$, which is coded by using $B_{j-1}$ and $Q_{j-1}$ from the next lower order set. From FIG. 4, the relation among $C_j$, $Q_j$ and $B_j$ is obtained as illustrated in Table 5 listed below.

TABLE 5

| $C_j$ | $Q_j$ | $B_j$ |
|---|---|---|
| 1 | 1 | 1 |
| 0 | 1 | 0 |
| 0 | 0 | 1 |
| −1 | 0 | 0 |

The rounding carry $Cr_{j-1}$ represented by using $Q_{j-1}$ and $B_{j-1}$ according to Table 5 is illustrated in FIG. 5. In case where $Cr_{j-1}=0$, there are two combinations of the values of $Q_{j-1}$ and $B_{j-1}$, namely, $(Q_{j-1}, B_{j-1})=(1, 0)$ or $(0, 1)$. Here, the value of $Q_{j-1}$ is determined in such a manner to be equal to the value of $Q_{j-1}$. Namely, if $X_{i-1}$ is 1, $Q_{j-1}=1$.

Thus, the rounding carry $Cr_{j-1}$ is obtained from FIG. 5 by using $Q_{j-1}$ and $B_{j-1}$ as the equation (11).

$$Q_{j-1} = Xp_{i-1} \quad (11)$$

$$B_{j-1} = Xp_{i-2} \cdot \{Xo_{i-1} \cdot (Xm_{i-2} + Xp_i + Xm_i) +$$

$$Xm_{i-1} \cdot (Xm_{i-2} + Xp_i + Xm_i)\}$$

In this way, the rounding carry generating circuit 303 of FIG. 3 can be constructed. It is understood that the rounding carry generating circuit 303 is constructed by three gate delaying stages and namely has the same number of delaying stages as the redundant binary 2-bit Booth recoding circuit 301 is provided with for calculating $B_j$ and thus the rate or speed at which the redundant binary 2-bit Booth recoding circuit obtains a recoded value is hardly increased by being provided with the rounding carry generating circuit 303.

Further, the 0-value generating circuit 304 generates 0 as a carry. Considering a case that $C_j=0$ in Table 5, there are two combinations of the values of $B_j$ and $Q_j$, namely, $(B_j, Q_j)=(1, 0)$ or $(0, 1)$. Therefore, it is understood that the circuit should be formed such that $B_j$ and $Q_j$ are always logical inversions as illustrated in FIG. 3 and that a 0-value can be generated at a high speed.

Thus, the redundant binary 2-bit Booth recoding circuit is constructed as illustrated in FIG. 3. Further, by employing this redundant binary 2-bit Booth recoding circuit, an iterative multiplication circuit is constructed as illustrated in FIG. 2. Namely, the iterative multiplication circuit of the present invention does not use a binary number converting circuit and a rounding circuit in the course of performing an iterative multiplication operation, whereby an iterative multiplication operation, in which the result of each multiplication is rounded, can be performed at a high speed.

Next, an iterative multiplication device for performing an iterative multiplication operation by using data of a carry saving type will be described hereinbelow as a second embodiment of the present invention. Similarly as in case of using a redundant binary number, a multiplication processing device for performing an iterative multiplication operation by using data of the carry saving type has the construction as illustrated in FIG. 2. First, a multiplier recoding circuit which can input data of the carry saving type will be described.

An operation of recoding an intermediate product X represented in the carry saving form by using Xc and Xs is composed of two steps to be performed. Here, it is assumed that an ith digit of the intermediate product is represented by 2 bits $Xc_i$ and $Xs_i$, the weight of each of which is $2^i$. Incidentally, $Xc_i$ and $Xs_i$ are 0 or 1. First, the intermediate product X is divided into consecutive 2-digit groups. In step 1, an intermediate carry $C_j$ and an intermediate sum $S_j$ corresponding to each group is calculated such that the following relation between $C_j$ and $S_j$ be satisfied in each group.

$$4 \cdot C_j + S_j = 2 \cdot (Xc_{2j+1} + Xs_{2j+1}) + (Xc_{2i} + Xs_{2i}).$$ Here, the intermediate carry $C_j$ has any one of three values 0, 1 and 2, and the intermediate sum $S_j$ has any one of five values $-3, -2, -1, 0$ and 1. This is illustrated in Table 6 listed below.

TABLE 6

(Step 1)

| $Xc_{2j+1}$ | $Xs_{2j+1}$ | $Xc_{2i}$ | $Xs_{2i}$ | $Xc_{2i-1}$ | $C_j$ | $S_j$ |
|---|---|---|---|---|---|---|
| 0 | 0 | 0 | 0 | 0 | 0 | 0 |
| 0 | 0 | 0 | 0 | 1 | 0 | 0 |
| 0 | 0 | 0 | 1 | 0 | 0 | 1 |
| 0 | 0 | 0 | 1 | 1 | 1 | −3 |
| 0 | 0 | 1 | 0 | 0 | 0 | 1 |
| 0 | 0 | 1 | 0 | 1 | 1 | −3 |
| 0 | 0 | 1 | 1 | 0 | 1 | −2 |
| 0 | 0 | 1 | 1 | 1 | 1 | −2 |
| 0 | 1 | 0 | 0 | 0 | 1 | −2 |
| 0 | 1 | 0 | 0 | 1 | 1 | −2 |
| 0 | 1 | 0 | 1 | 0 | 1 | −1 |
| 0 | 1 | 0 | 1 | 1 | 1 | −1 |
| 0 | 1 | 1 | 0 | 0 | 1 | −1 |
| 0 | 1 | 1 | 0 | 1 | 1 | −1 |
| 0 | 1 | 1 | 1 | 0 | 1 | 0 |
| 0 | 1 | 1 | 1 | 1 | 1 | 0 |
| 1 | 0 | 0 | 0 | 0 | 1 | −2 |
| 1 | 0 | 0 | 0 | 1 | 1 | −2 |
| 1 | 0 | 0 | 1 | 0 | 1 | −1 |
| 1 | 0 | 0 | 1 | 1 | 1 | −1 |
| 1 | 0 | 1 | 0 | 0 | 1 | −1 |
| 1 | 0 | 1 | 0 | 1 | 1 | −1 |
| 1 | 0 | 1 | 1 | 0 | 1 | −2 |
| 1 | 0 | 1 | 1 | 1 | 1 | −2 |
| 1 | 1 | 0 | 0 | 0 | 1 | 0 |
| 1 | 1 | 0 | 0 | 1 | 1 | 0 |
| 1 | 1 | 0 | 1 | 0 | 1 | 1 |
| 1 | 1 | 0 | 1 | 1 | 2 | −3 |
| 1 | 1 | 1 | 0 | 0 | 1 | 1 |
| 1 | 1 | 1 | 0 | 1 | 2 | −3 |
| 1 | 1 | 1 | 1 | 0 | 2 | −2 |
| 1 | 1 | 1 | 1 | 1 | 2 | −2 |

In step 2, the intermediate sum $S_j$ and the intermediate carry from the next lower order group $C_{j-1}$ corresponding to each group, which are obtained in step 1, are added and then a recoded multiplier $Re_j$ is calculated correspondingly to each group. Here, the recoded multiplier $Re_j$ has any one of values $-2, -1, 0, 1$ and 2. Therefore, the sum $(C_{j-1} + S_j)$ should be within the range of a value of from $-2$ to 2. Thus, in step 1, regarding each group, corresponding $C_j$ and $S_j$ are determined by examining two digits of the group and a higher order digit $(Xc_{2i-1})$ of the next lower order group. As the result, $C_j$ and $S_j$ corresponding to each group are determined as described in Table 6. For instance, when $Xc_{2i+1}$, $Xs_{2i+1}$, $Xc_{2i}$ and $Xs_{2i}$ are 0, 0, 0 and 1, respectively (namely, $(Xc_{2i+1}, Xs_{2i+1}, Xc_{2i}$ and $Xs_{2i})=(0, 0, 0, 1)$), the value of this group becomes 1. Therefore, there are two combinations of the values of $C_j$ and $S_j$, namely, $(C_j, S_j)=(1, -3)$ or $(0, 1)$. Here, pay attention to $Xc_{2i+1}$. In case that $Xc_{2i+1}$ is 0, Cj necessarily is 0 or 1. Further, in case that $Xc_{2i+1}$ is 1, $C_j$ necessarily is 1 or 2. Thus, in case of taking notice of the next lower order group, when $Xc_{2i-1}$ is 0, the carry from the next lower order group $C_{j-1}$ necessarily has a value of 0 or 1. In this case, if the values of $C_j$ and $S_j$ are set as 1 and $-3$, respectively (namely, $(C_j, S_j)=(1, -3)$), $Re_j$ becomes $-3$ or $-2$ as the result of the calculation of the equation $Re_j = C_{j-1} + S_j$ in step 2 and thus the obtained value of $Re_j$ exceeds the range of the value of from $-2$ to 2. Conversely, if the values of $C_j$ and $S_j$ are set as 0 and 1, respectively (namely, $(C_j, S_j)=(0, 1)$), $Re_j$ becomes 1 or 2 and satisfies the above described condition. In this way, all of the values of $C_j$ and $S_j$ are determined by examining the value of $Xc_{2j+1}$ corresponding to the next lower order group. While a combination of $C_j$ and $S_j$ is changed in accordance with $Xc_{2j-1}$ in the previous description, this combination may be changed in accordance with $Xs_{2j-1}$.

Next, in step 2, the recoded value is generated in accordance with the equation $R_j = C_{j-1} + S_j$. The logical relation among $R_j$, $C_{j-1}$ and $S_j$ is shown in Table 7 listed below.

TABLE 7

(Step 2)

| | $Re_j$ | | |
|---|---|---|---|
| $C_{j-1}$ | 0 | 1 | 2 |
| $S_j$ | | | |
| −3 | — | −2 | −1 |
| −2 | −2 | −1 | 0 |
| −1 | −1 | 0 | 1 |
| 0 | 0 | 1 | 2 |
| 1 | 1 | 2 | — |

As above described, in case that a number of the carry saving type is recoded, similarly as in case of recoding a redundant binary number, an intermediate carry and an intermediate sum corresponding to each group are generated in step 1, and then the generated intermediate sum is added to an intermediate carry from the next lower order group and thus a recoded value is obtained in step 2. Therefore, it is apparent that a rounding operation can be performed by inputting the result of the rounding operation to a multiplier recoding circuit for recoding data corresponding to the lowest order group as an intermediate carry from the next lower order group, similarly as in case of using a redundant binary number as an intermediate product. Namely, the iterative multiplication circuit, which uses numbers of the carry saving type, can be realized without using a binary number converting circuit and a rounding circuit in the course of performing an iterative multiplication operation and can perform an iterative multiplication operation, in which the result of each multiplication is rounded, at a high speed.

Next, an iterative multiplication device which uses a binary number when a multiplication is iterated (namely, a third embodiment of the present invention) will be described hereinbelow.

Usually, a n-digit binary multiplier X is recoded as described in the following equation (12).

$$X = -X_s \times 2^n + \Sigma X_j \times 2^j \qquad (12)$$
$$= \Sigma(-2 \times X_{2j+1} + X_{2j} + X_{2j-1}) \times 2^{2j}$$

[in case where n is odd]; and $$= (-X_s + X_{n-1}) \times 2^n + \Sigma(-2 \times X_{2j+1} + X_{2j} + X_{2j-1}) \times 2^{2j}$$

[in case where n is even]

Incidentally, $X_n = X_s$ and $X_{-1} = 0$. Here, if $Z_{2j}$ is equal to $(-2 \times X_{2j+1} + X_{2j} + X_{2j-1})$, $Z_{2j}$ is a jth number obtained by a recoding performed by the 2-bit Booth recoding circuit (hereunder referred to as a jth 2-bit Booth recoding number) in case of counting the order of the jth set from the lowest order set.

In this case, a truth table corresponding to the 2-bit Booth recoding circuit is shown in Table 8. In this table, $X_{i+1}$, $X_i$ and $X_{i-1}$ are multipliers to be inputted. The 2-bit Booth recoding number $Z_j$ is represented by using a 3-bit signal indicating $Zs_j$, $Z1_j$ and $Z2_j$.

TABLE 8

| $X_{i+1}$ | $X_i$ | $X_{i-1}$ | $Z2_j$ | $Zs_j$ | $Z1_j$ | $Z2_j$ |
|---|---|---|---|---|---|---|
| 0 | 0 | 0 | 0 | 0 | 0 | 0 |
| 0 | 0 | 1 | 1 | 0 | 1 | 0 |
| 0 | 1 | 0 | 1 | 0 | 1 | 0 |
| 0 | 1 | 1 | 2 | 0 | 0 | 1 |
| 1 | 0 | 0 | −2 | 1 | 0 | 1 |
| 1 | 0 | 1 | −1 | 1 | 1 | 0 |
| 1 | 1 | 0 | −1 | 1 | 1 | 0 |
| 1 | 1 | 1 | −0 | 1 | 0 | 0 |

This logical relation is expressed by, for example, the following equation (13).

$$\begin{aligned} Zs_j &= X_{i+1} \\ Z1_j &= X_i \odot X_{i-1} \\ Z2_j &= \overline{X_{i+1}} \cdot X_i \cdot X_{i-1} + X_{i+1} \cdot \overline{X_i} \cdot \overline{X_{i-1}} \\ &= X_{i+1} \odot X_i \cdot \overline{X_i \odot X_{i-1}} \end{aligned} \qquad (13)$$

Figure 6:
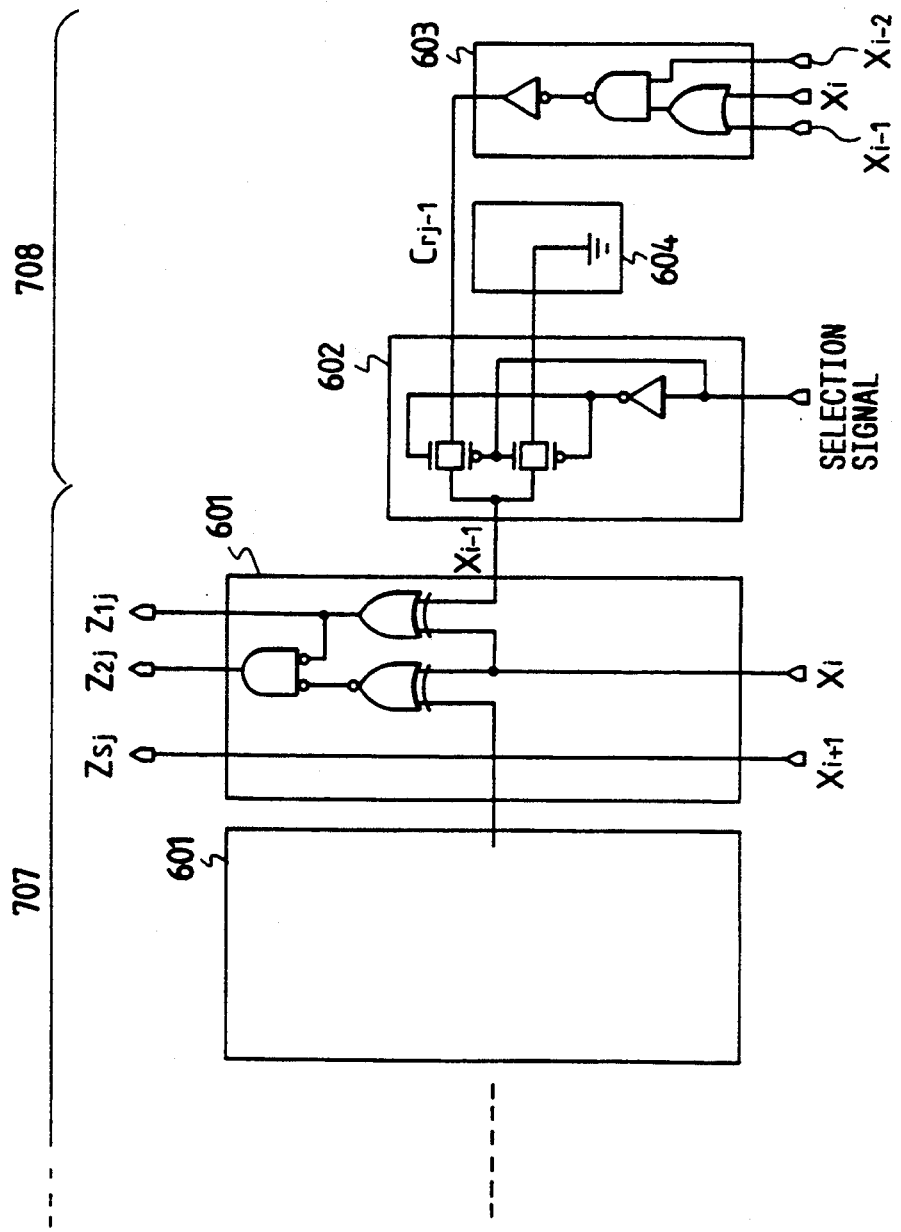
FIG. 6 is a logic diagram for illustrating a binary 2-bit Booth recoding circuit and a carry generating circuit of still another embodiment of the present invention.

When the logical relation expressed by the equation (13) is practically realized by using gates, a basic unit 601 of the binary 2-bit Booth recoding circuit of FIG. 6 is obtained. Namely, the recoded value of input data can be obtained by using two gate delaying stages at most.

Here, consider a case that data having a non-zero value at a digit, of which the order is equal to or less than that of a digit corresponding to $2^{i-1}$, is rounded to a digit corresponding to $2^i$. In this case, if a carry generated due to the rounding of the data to the digit corresponding to $2^i$ is $Cr_{j-1}$, a value held at the digit corresponding to $2^i$ becomes a sum of $X_i$ and the rounding carry $Cr_{j-1}$ (namely, $(X_i + Cr_{j-1})$). Thus, the recoded value $Z_i$ of the lowest order set is obtained by the following equation (14).

$$\begin{aligned} Z_i &= -2 \times X_{i+1} + (X_i + Cr_{i-1}) \\ &= -2 \times X_{i+1} + X_i + Cr_{i-1} \end{aligned} \qquad (14)$$

Namely, as is seen from the equation (14), the recoded value $Z_i$ in case of performing the input value to the digit corresponding to $2^i$ can be obtained only by inputting the rounding carry $Cr_{j-1}$ instead of $X_{i-1}$. Therefore, similarly as in case of the first embodiment, the rounding carry is usually inputted to a terminal, which corresponds to $X_{i-1}$, of the circuit for recoding $X_{i+1}$, and $X_{i-1}$, and in case where there is no necessity of a rounding operation, 0 should be inputted to the terminal corresponding to $X_{i-1}$ thereof.

Thus, the multiplier recoding circuit and the carry generating circuit are constructed as Illustrated in FIG. 6. In this figure, reference numeral 602 designates a selection circuit for selecting and outputting an output value of a rounding carry generating circuit 603 or an output of a 0-value generating circuit 604 in accordance with a selection signal. Reference numeral 603 denotes the rounding carry generating circuit for rounding an input number to a digit corresponding to $2^i$. Reference numeral 604 designates the 0-value generating circuit for generating a signal representing a value of 0. Further, the rounding carry generating circuit 603 is constructed in the following manner. Hereinafter, will be described a case that the rounding to the nearest operation according to IEEE 754 Standard is performed therein, similarly as in the previously described embodiment. Incidentally, a digit corresponding to $X_{i-2}$ is assumed to be what is called a "sticky digit" for digits of which the orders are equal to or lower than the digit corresponding to $2^{i-2}$. In this case, the rounding carry $Cr_{j-1}$ is obtained as shown in Table 9 listed below.

TABLE 9

| $X_{i-1}$ | $X_{i-2}$ | $Cr_{j-1}$ |
|---|---|---|
| 0 | 0 | 0 |
| 0 | 1 | 0 |
| 1 | 1 | 1 |
| 1 | 0 | $X_i$ |

As is seen from Table 9, in case where $X_{i-1}$ and $X_{i-2}$ are 1 and 0, respectively (namely, $(X_{i-1}, X_{i-2})=(1, 0)$), the carry $Cr_{j-1}$ is equal to $X_i$ as previously described. Therefore, a logical circuit constructed according to Table 9 becomes like the carry generating circuit 603 of FIG. 6.

Figure 7:
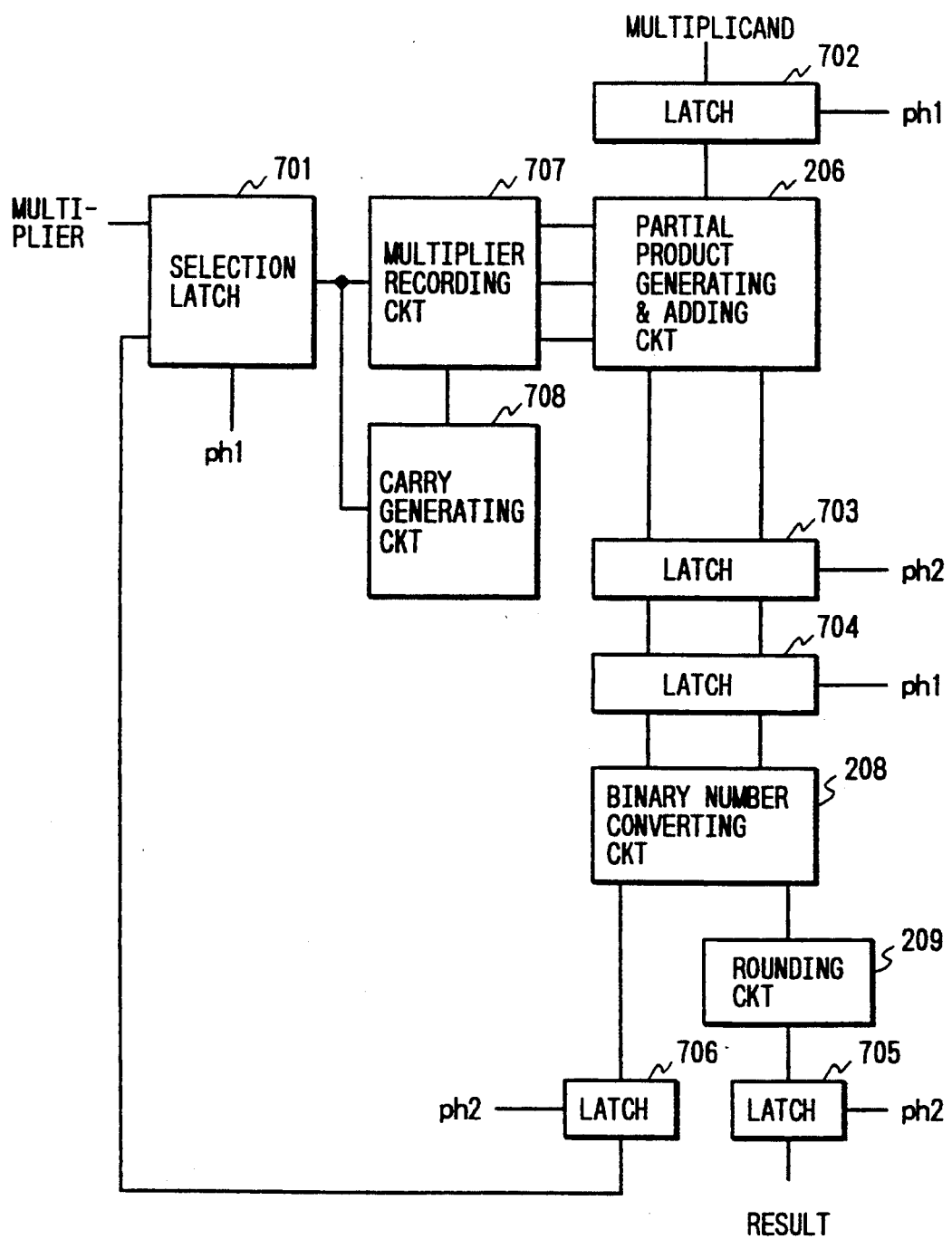
FIG. 7 is a schematic block diagram for showing the construction of a binary iterative multiplication processing device according to the present invention.

Thus, a multiplication processing device of FIG. 7 employing the present invention can be implemented by inputting the rounding carry to the 2-bit Booth recoding circuit as an input value originated from the next lower order set as illustrated in FIG. 6. In FIG. 7, reference numerals 701 to 706 designate latches which operates in response to two-phase clock signals ph1 and ph2. Reference numeral 707 represents the multiplier recoding circuit which is indicated by like reference numeral in FIG. 6. Reference numeral 708 denotes a carry generating circuit which includes the selection circuit 602, the carry selecting circuit 603 and the 0-value generating circuit 604 of FIG. 6. With the configuration of FIG. 7, the multiplication processing device embodying the present invention can eliminate the necessity of letting the result of each multiplication of the iterative multiplication through the rounding circuit 209. Namely, the multiplication processing device of the present invention can let such data through the rounding circuit 209 only when a final result is obtained. Therefore, in comparison with the conventional multiplication processing device, the multiplication processing device of the present invention can perform an iterative multiplication operation at a higher speed.

As above described, in case of using a redundant binary data, data of the carry saving type or binary data, an iterative multiplication operation in which the result of each multiplication is rounded can be performed by the multiplication processing device of the present invention at a high speed. Incidentally, in case of performing an iterative multiplication operation by using other values having a large radix, the similar effects can be obtained by applying the present invention thereto. Further, when a redundant binary 2-bit Booth recoding circuit is constructed, a multiplier recoding circuit having simple logics can be obtained by using $B_j$ and $R_j$ instead of the intermediate carry $C_j$ and the intermediate sum $S_j$, respectively, as expressed in the equation (4).

Next, another embodiment of the present invention which multiplies a multiplicand by a value obtained by subtracting a multiplier from a constant A and uses the result of the multiplication as an input operand for the next multiplication will be described hereinbelow.

Before explaining the construction of a first example of such an embodiment, a division using Newton-Raphson method will be described hereinbelow. Here, consider a division of mantissa portions of two normalized floating point numbers Y/X. The Newton-Raphson method is known as an algorithm for obtaining an approximate value of (1/X). According to this method, the approximate value $R_i$ of (1/X) is obtained by using the following recurrence Formula (15).

$$R_0 = 1/X \pm \delta$$

$$R_i = R_{i-1} \times (2 - R_{i-1} \times X) \tag{15}$$

where $R_0$ designates an initial approximate value of (1/X), and $\delta$ denotes an error between $R_0$ and (1/X). A quotient can be obtained by performing an operation $(R_i \times Y)$ after the error between $R_0$ and (1/X) becomes equal to or less than a desired value. As is seen from the equation (15), the recurrence formula used for performing an iterative multiplication operation is expressed by the combination of multiplications of two types. The multiplication of a first type is an ordinary multiplication expressed like $\alpha \times \beta$. Further, the multiplication of a second type is a multiplication expressed like $\alpha(2 - \beta)$. Hereinafter, it will be described how the present invention is effective in performing the second type of the multiplication.

For brevity of explanation, use A for $R_{i-1}$ and also use B for $(R_{i-1} \times X)$ in the equation (15). Thereby, it is understood that the equation (15) is rewritten as $A(2-B)$ expressing the second type multiplication. Here, B is obtained from the equation (15) as follows.

$$\begin{aligned} B &= R_{i-1} \times X \\ &= 1 - (X \times (\pm \delta))^j \end{aligned} \tag{16}$$

Incidentally, in the equation (16), $j = 2^{(i-1)}$.

Additionally, X is a normalized number (namely, $1 \leq X < 2$). Thus, it is understood that B is close to 1. Here, it is assumed that B is represented by using a binary number. At that time, the term $(2-B)$ of the expression $(A \times (2-B))$ is rewritten by taking the 2's complement of a term $(-B)$ as the following equation (17).

$$\begin{aligned} 2 - B &= 2 + (-B) \\ &= 2 + (\overline{B} + LSB) \\ &= (2 + \overline{B}) + LSB \end{aligned} \tag{17}$$

where LSB is a value of 1 to be added to the least significant digit of the bit string of B, which is generated when taking the 2's complement. For convenience of explanation, it is supposed that B is a 8-digit number. Moreover, as described above, B is close to 1. Therefore, B can be expressed as follows.

$$B = B_0. B_1 B_2 B_3 B_4 B_5 B_6 B_7 \tag{18}$$

By using the expression (18), the equation (17) is expressed as follows.

$$\begin{array}{r} 2 = 1\ 0.\ 0\ 0\ 0\ 0\ 0\ 0\ 0 \\ \overline{B} = 0 \overline{B_0}.\ \overline{B_1}\overline{B_2}\overline{B_3}\overline{B_4}\overline{B_5}\overline{B_6}\overline{B_7} \\ \hline +)\quad LSB = \hspace{3cm} 1 \\ \hline 2 + \overline{B} = 0\overline{B_0}.\ \overline{B_1}\overline{B_2}\overline{B_3}\overline{B_4}\overline{B_5}\overline{B_6}\overline{B_7} \\ +)\quad LSB = \hspace{3cm} 1 \end{array}$$

Thus, in case of the device of the present invention, the term $(2-B)$ is obtained by using the equation (17) in the Following manner. Namely, when the second type of the multiplication $A \times (2-B)$ is performed, a value $\overline{B}$ obtained by performing a logical inversion of each digit of B is inputted to the multiplier recoding circuit. In addition to this, "01" is set at two digits before (or, the orders of which is higher than) the binary point. Further, "1" (namely, LSB) is inputted to the recoding circuit for recoding the value set at the least significant digit as a carry from the next lower order set. Thus, it comes to the same thing as in case of inputting $(2-B)$ as a multiplier.

Figure 8:
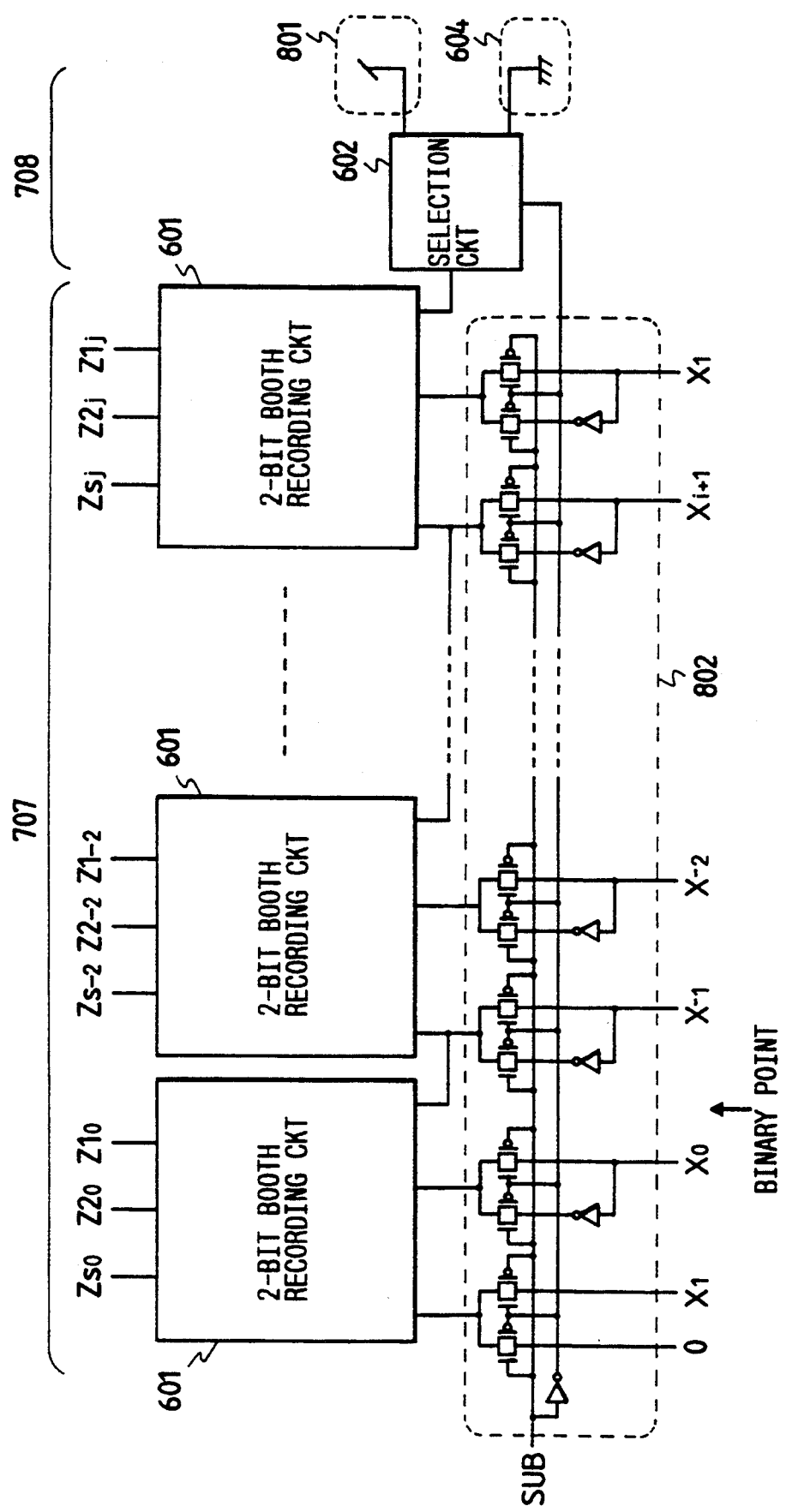
FIG. 8 is a logic diagram for illustrating a binary 2-bit Booth recoding circuit, which subtracts the result of a multiplication from 2 and recodes the result of the subtraction, and a carry generating circuit of yet another embodiment of the present invention.
Figure 9:
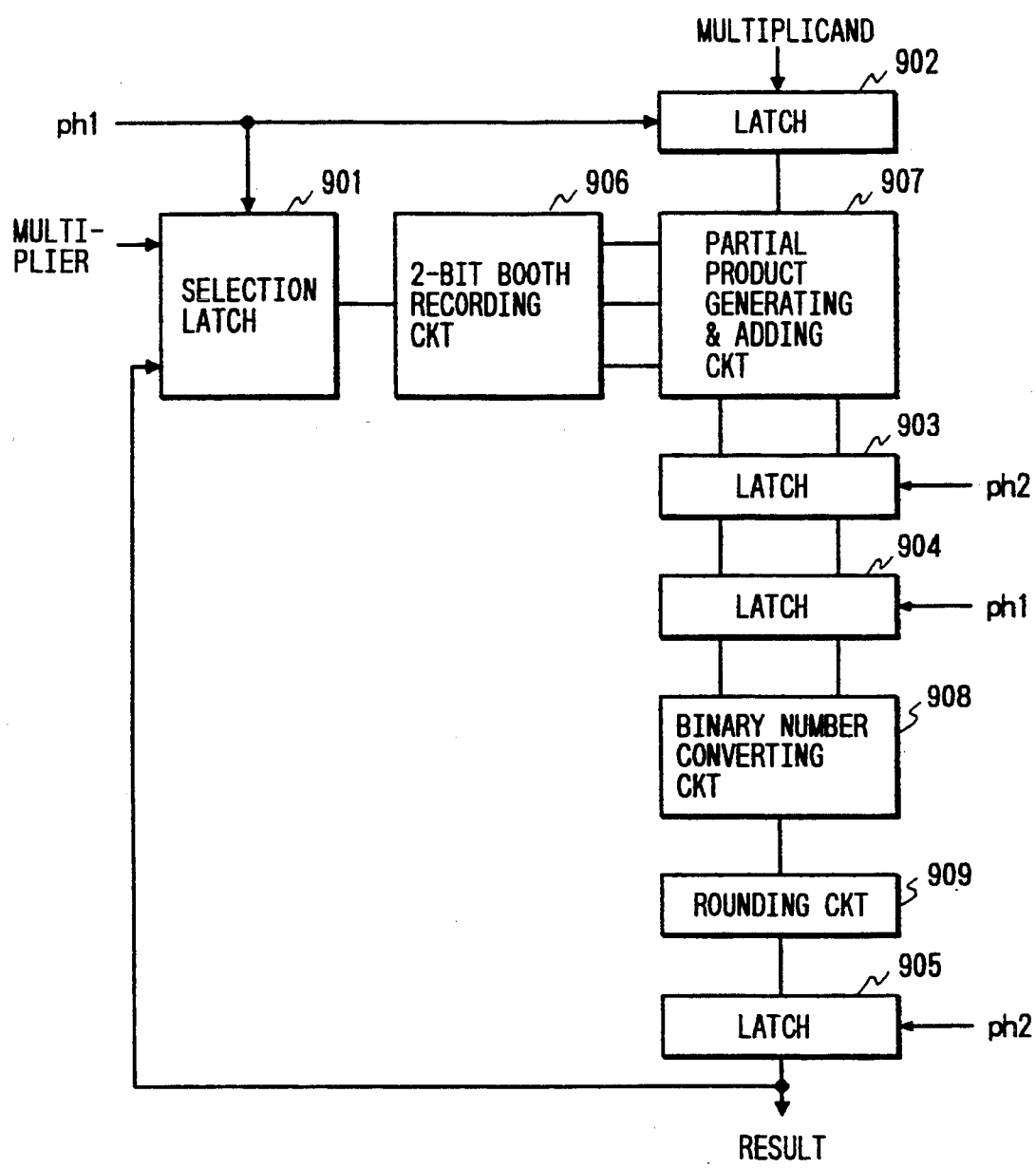
FIG. 9 is a schematic block diagram for showing the construction of a conventional multiplication processing device which performs a rounding operation on completion of each multiplication.
Figure 10:
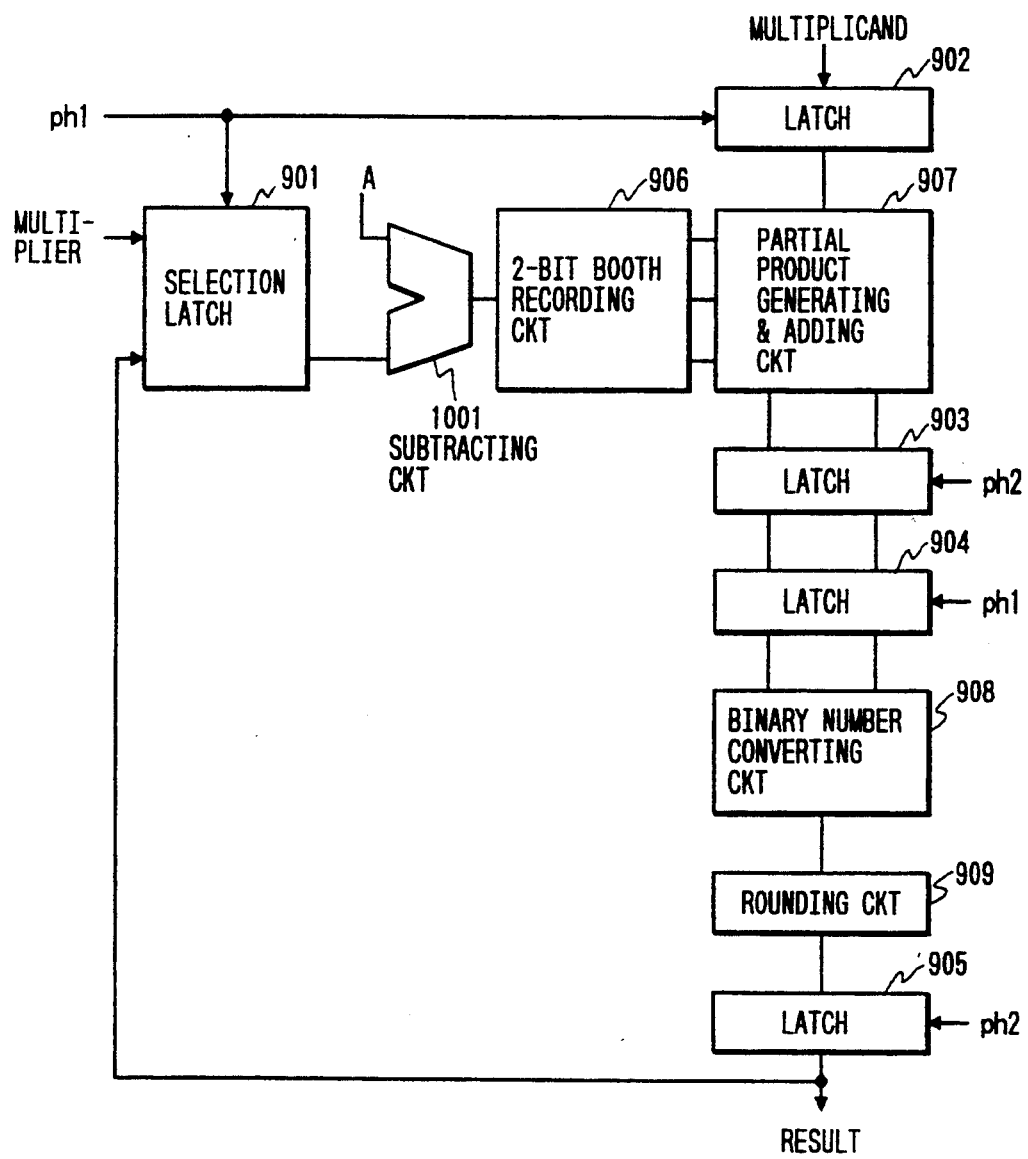
FIG. 10 is a schematic block diagram for showing the construction of another conventional multiplication processing device which multiplies a multiplicand by a value obtained by subtracting a multiplier from a constant A and uses the result of the multiplication as a multiplier for the next multiplication.

Thus, for instance, the circuit of FIG. 8 can be implemented. In FIG. 8, reference numeral 801 designates a one-value generating circuit for generating LSB of the equation (17). When inputting a signal SUM indicating that an operation to be performed is $A \times (2-B)$, an output value of the one-value generating circuit 801 is selected by the selection circuit 602. Reference numeral 802 denotes a selection circuit which sets 0 at a second digit, the order of which is higher than the binary point, of data to be inputted to the recoding circuit and also sets values, which are obtained by the logical inversion of the input value, at the other digits thereof when inputting the signal SUB. Namely, when the multiplication $A \times (2-B)$ is performed by using the present invention, the data, of which the second digit before the decimal point has a value of 0 and the other digits have the values obtained by the logical inversions of the corresponding digits of the input value, are inputted to the recoding circuit, there is no necessity of using a subtracting circuit as the conventional multiplication device. Further, the subtraction can be performed by using less hardware at a high speed.

Next, it will be described hereinbelow how the value of a square root of the input value X is obtained by using Newton-Raphson method. in this case, a recurrence formula (19) for obtaining the value of $(1/X^{\frac{1}{2}})$ is as follows.

$$R_0 = (1/X^{\frac{1}{2}}) \pm \delta 2 \times R_i = R_{i-1} \times (3 - R_{i-1}^2 \times X) \tag{19}$$

where $R_0$ designates an initial approximate value of $(1/X^{\frac{1}{2}})$, and $\delta$ denotes an error between $R_0$ and $(1/X^{\frac{1}{2}})$. The value of the square root can be obtained by performing an operation $(R_i \times X)$ after the error between $R_0$ and $(1/X^{\frac{1}{2}})$ becomes equal to or less than a desired value. In the recurrence formula (19), the term $(R_{i-1}^2 \times X)$ is close to 1. Here, if B is used for $(R_{i-1}^2 \times X)$, B can be represented similarly as the equation (18). Further, the term $(3 - R_{i-1}^2 \times X)$ of the equation (19) is modified as the following equation (20) by using B for the term $(R_{i-1}{}^2 \times X)$.

$$
\begin{aligned}
3 - B &= 3 + (-B) \\
&= 3 + (\overline{B} + LSB) \\
&= (3 + \overline{B}) + LSB.
\end{aligned}
\tag{20}
$$

The equation (20) can be expressed by using values $B_0$, $B_1$, $B_2$, $B_3$, $B_4$, $B_5$, $B_6$ and $B_7$ held at digits of B as follows.

$$
\begin{array}{r}
3 = 1\ 1.\ 0\ 0\ 0\ 0\ 0\ 0\ 0 \\
B = 0\overline{B_0}.\ \overline{B_1}\overline{B_2}\overline{B_3}\overline{B_4}\overline{B_5}\overline{B_6}\overline{B_7} \\
\hline
+) \quad LSB = \phantom{0\overline{B_0}.\ \overline{B_1}\overline{B_2}\overline{B_3}\overline{B_4}\overline{B_5}\overline{B_6}}1 \\
\hline
3 + B = \overline{B_0}B_0.\ \overline{B_1}\overline{B_2}\overline{B_3}\overline{B_4}\overline{B_5}\overline{B_6}\overline{B_7} \\
+) \quad LSB = \phantom{0\overline{B_0}.\ \overline{B_1}\overline{B_2}\overline{B_3}\overline{B_4}\overline{B_5}\overline{B_6}}1
\end{array}
$$

Therefore, in case of the device of the present invention, the equation (20) can be calculated in the following fashion. Namely, when performing the multiplication $(A \times (3-B))$, data obtained by inverting the values held at digits of B other than the two digits before the binary point and setting a value $B_0$ at the first digit before the binary point and setting a value $\overline{B_0}$ at the second digit before the binary point is inputted to the multiplier recoding circuit. Moreover, a value of 1 (namely, LSB) is inputted to the recoding circuit for recoding the value held at the least significant digit of the input value as a carry from the next lower order set. Thereby, it comes to the same result as in case of inputting $(3-B)$ as a multiplier. Thus, when calculating the term $(3-B)$, logical inversion circuits are provided correspondingly to digits of B other than the two digits before the decimal point. Further, a value set at the first digit of B is inputted without any change and a value which is the inversion of the first digit of B is inputted at the second digit. Thereafter, output values of the logical inversion circuits are inputted to the multiplier recoding circuit and the carry generating circuit. As the result, there is no necessity of using a subtracting circuit as the conventional multiplication device. Furthermore, the subtraction can be performed by using less hardware at a high speed.

In the foregoing examples, a binary number is used as B. In order to realize a multiplication processing device which can perform an iterative multiplication operation at a higher speed, a value of an intermediate product (namely, a redundant binary number in this case) is inputted as B. In this case, the configuration of the circuit is the same as illustrated in FIG. 2. Incidentally, a selection circuit 1201 illustrated in FIG. 12 should be added to the multiplier recoding circuit 207. To perform a division by using Newton-Raphson method expressed by the equation (15), B indicated in the equation (16) is first outputted from the latch 203 and then is inputted to the selection latch 201. Further, in the next cycle, a simple bit operation is effected before recoding the multiplier, and then the value $(2-B)$ is recoded by using the multiplier recoding circuit 207. Subsequently, the recoded value is inputted o the partial product generating and adding circuit 206. At that time, $R_{i-1}$ is inputted to the latch 202. Then, the multiplication $(R_{i-1} \times (2-R_{i-1} \times X))$ is performed. In contrast, in case of calculating the value of a square root by using Newton-Raphson method, B indicated by the equation (20) is outputted from the latch 203 and is then inputted to the latch 201. Subsequently, in the next cycle, a simple bit operation is performed on a multiplier. Then, the value of the term $(3-B)$ is generated by using the multiplier recoding circuit 207. Thereafter, the recoded value is inputted to the partial product generating and adding circuit 206. At that time, $R_{i-1}$ is inputted to the latch 202. Then, the multiplication $(R_{i-1} \times (3-R_{i-1}{}^2 \times X))$ is effected.

As described above, in case of performing a division or calculating the value of a square root by using Newton-Raphson method, an intermediate sum is inputted to the multiplier recoding circuit and then the calculation of the term $(2-B)$ or $(3-B)$ is effected by a simple bit operation when recoding a multiplier. Hereinafter, it will be described how such a simple bit operation is performed.

Here, let B be a redundant binary number, which is close to 1, outputted from the latch 202. Further, suppose the difference between B and 1 is less than, for example, $2^{-g}$. FIG. 11 is a table for illustrates whether or not, regarding two digits directly before and one digit after the binary point of a redundant binary number, corresponding values held at such digits of B (close to 1 and is different from 1 by a value less than $2^{-g}$) are present. In FIG. 11, a column 111 indicates values which the two digits immediately before the binary point and one digit directly after the binary point can take. Further, a column 112 indicates whether or not the corresponding values of the digits of B are present in the values indicated in the column 111, as well as what present values of the digits of B are. In FIG. 11, dotted lines indicate that there are no corresponding values of such digits of B. Moreover, a column 113 indicates redundant binary values obtained by calculating the term $(2-B)$ by using the values of B indicated in the column 112. Furthermore, a column 114 indicates redundant binary values obtained by calculating the term $(3-B)$ by using the values of B indicated in the column 112.

The column 112 is generated in the following manner. Incidentally, B is a result of a multiplication of mantissas and is necessarily positive. The column 111 indicates the values extracted at two digits just before and one digit just after the binary point. Therefore, the value indicated in the column 11 as negative is a mere dummy negative value. Thus, in case of, for instance, TT.T, 1 is necessarily present at a third digit before the binary point because the result of the multiplication B is inevitably positive. Consequently, TT.T should become equal to 1T.T (incidentally, $T = -1$). Further, 1T.T is 00.1 in binary notation. Namely, if values of 1 are consecutively present at digits of which the orders are less than the order of the second digit after the binary point, the value indicated by using all digits is close to 1. The value of B in such a case is expressed by the following expression (21).

$$B = 1T.\ T111111 \tag{21}$$

Further, the term $(2-B)$ is expressed by the following expression (22−1), which is further modified as the following expression (22−2).

$$
\begin{array}{r}
2 = 10.\ 0000000 ... \\
-)\quad B = 1T.\ T111111 ... \\
\hline
2 - B = 01.\ 1TTTTTT ... \\
2 - B = 01.\ 01TTTTT ...
\end{array}
\quad
\begin{array}{l}
(22\text{-}1) \\
(22\text{-}2)
\end{array}
$$

Moreover, the term (3−B) is expressed by the following expression (23-1), which is further modified as the following expression (23-2).

$$
\begin{array}{rl}
 & 3 = 11.\ 0000000\ ... \\
-) & B = 1T.\ T111111\ ... \\
\hline
 & 3 - B = 02.\ 1T\overline{TTTTT}\ ... \quad (23\text{-}1) \\
 & 3 - B = 10.\ 01\overline{TTTTT}\ ... \quad (23\text{-}2)
\end{array}
$$

The table of FIG. 11 is obtained in the manner as indicated in the expressions (22-2) and (23-2). Here, refer to the column indicating the values of the term (2−B) (namely, the column 113) of FIG. 11. In cases of all values of the term (2−B), the three highest digits are 010 (more particularly, 01.0). Further, if the value held at the first digit of B after the binary point is 0, the value held at the second digit of the term (2−B) after the binary point becomes equal to the value obtained by inverting the sign of the value held at the second digit of B after the binary point. In contrast, if the value held at the first digit of B after the binary point is other than 0, the value held at the second digit of the term (2−B) after the binary point becomes equal to the value held at the second digit of B after the binary point. Moreover, the values held at digits of which the orders are equal to or lower than that of the third digit of the term (2−B) after the binary point are values obtained by inverting the signs of the values held at the corresponding digits of B after the binary point, respectively. Similarly, refer to the column indicating the values of the term (3−B) (namely, the column 114) of FIG. 11. In cases of all values of the term (3−B), the three highest digits are 100 (more particularly, 10.0). Further, if the value held at the first digit of B after the binary point is 0, the value held at the second digit of the term (3−B) after the binary point becomes equal to the value obtained by inverting the sign of the value held at the second digit of B after the binary point. In contrast, if the value held at the first digit of B after the decimal point is other than 0, the value held at the second digit of the term (3−B) after the binary point becomes equal to the value held at the second digit of B after the decimal point. Moreover, the values held at digits of which the orders are equal to or lower than that of the third digit of the term (3−B) after the binary point are values obtained by inverting the signs of the values held at the corresponding digits of B after the binary point, respectively. Namely, the operations of calculating the terms (2−B) and (3−B) can be easily performed only by setting the constant and effecting the simple operation and the inversion of the signs.

Figure 12:
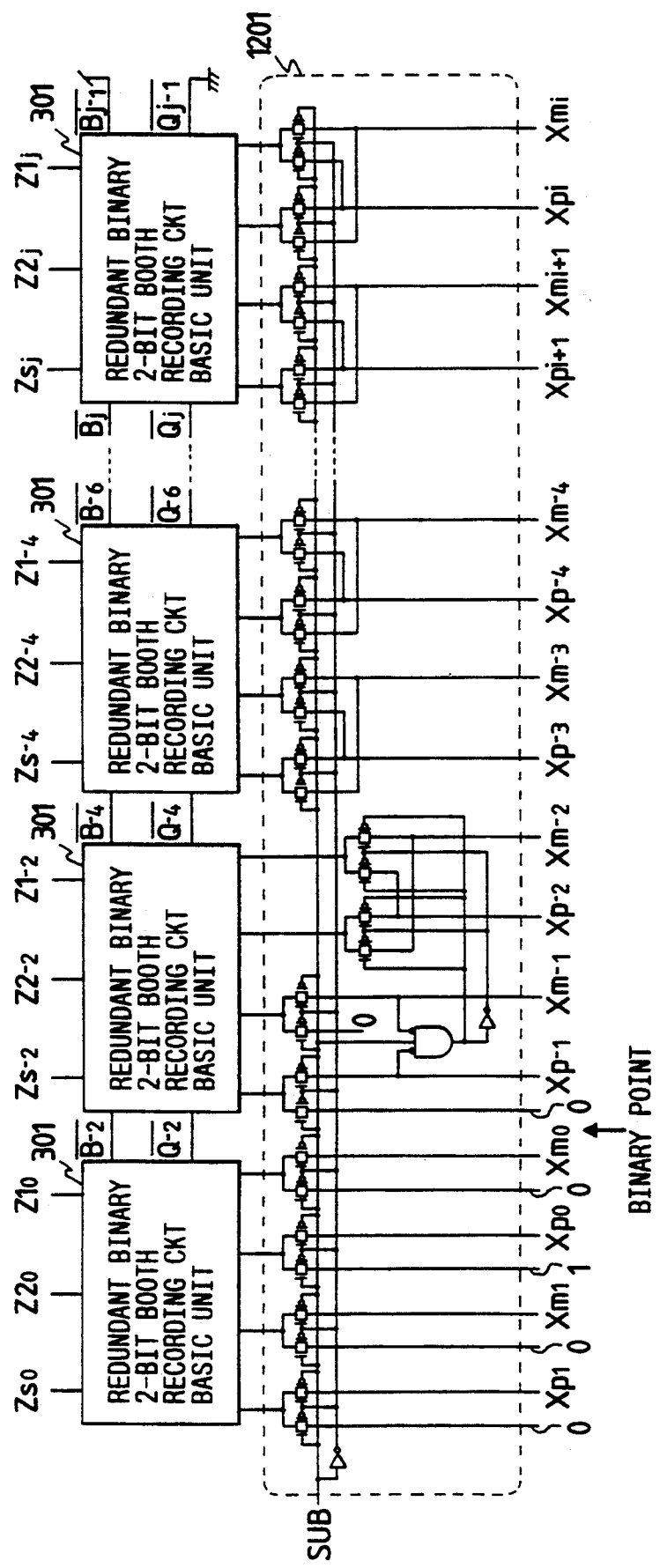
FIG. 12 is a circuit diagram for illustrating a binary 2-bit Booth recoding circuit, which subtracts an intermediate product represented by a redundant binary value from 2 and recodes the result of the subtraction, and a selection circuit of further another embodiment of the present invention.
Figure 13:
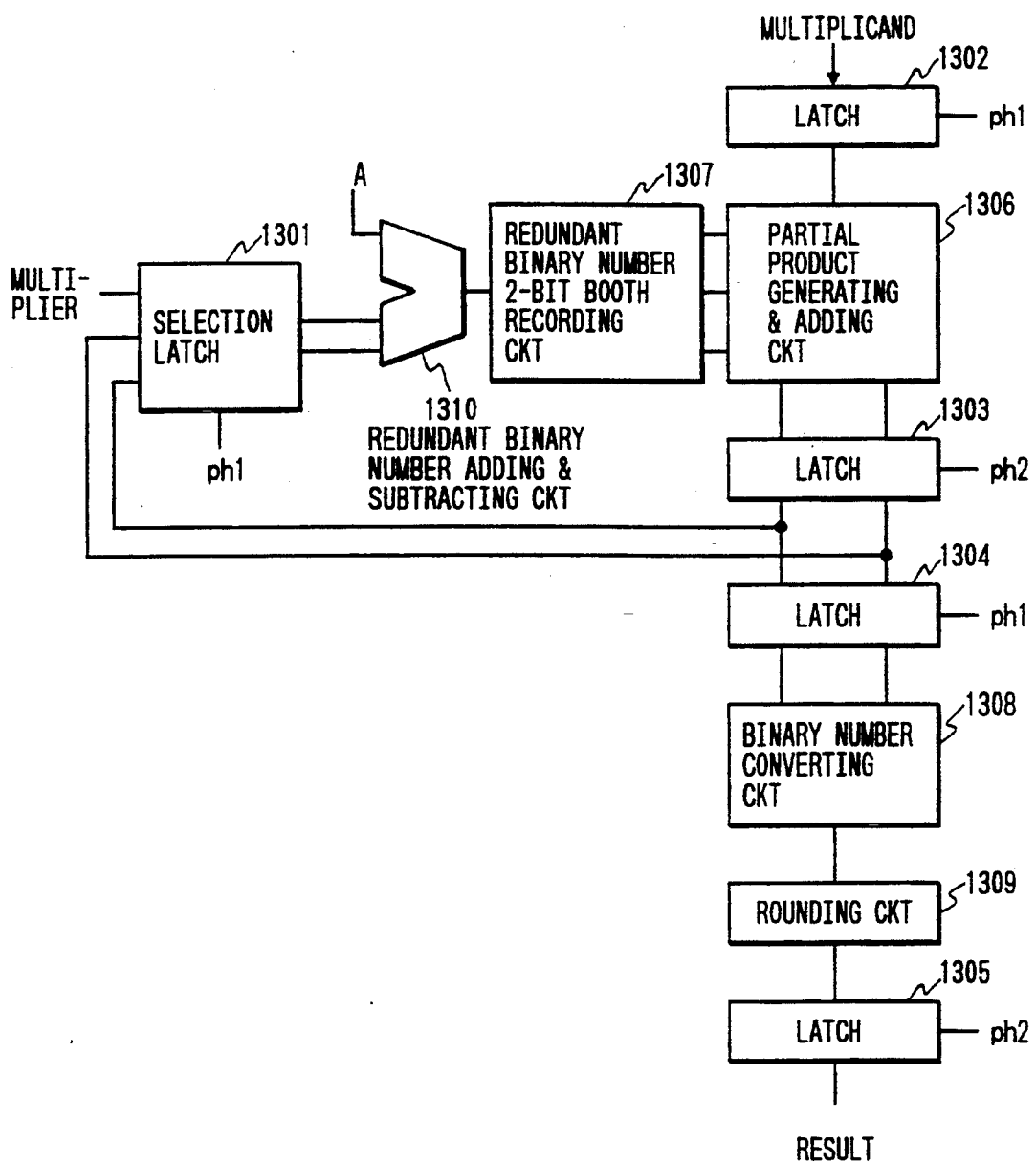
FIG. 13 is a schematic block diagram for showing the construction of a conventional iterative multiplication processing device which multiplies a multiplicand by a value obtained by subtracting a redundant binary intermediate product from a constant A.

FIG. 12 is a schematic block diagram of showing the construction of the practical multiplier recoding circuit having the function of calculating the term (2−B). In FIG. 12, reference numeral 301 designates the basic unit of the redundant binary 2-bit Booth recoding circuit of FIG. 3. Reference numeral 1201 denotes the selection circuit for controlling input values to be inputted to the basic unit of the redundant binary 2-bit Booth recoding circuit. Incidentally, it is assumed that the redundant binary number is coded as indicated in Table 1. A signal SUB indicates that the calculation of the term (2−B) is performed. When inputting the signal SUB, "010" (corresponding to the cases that (Xp, Xm)=(0, 0), (1, 0) and (0, 0)) are inputted to the high-order three digits of the term (2−B). Further, if a redundant binary input value corresponding to the first digit after the decimal point is "0" (corresponding to the case that (Xp$_{-1}$, Xm$_{-1}$) =(0, 0)), a redundant binary value (Xp$_{-2}$, Xm$_{-2}$) is swapped and inputted to the second digit after the binary point thereof. In contrast, if a redundant binary input value corresponding to the first digit after the binary point is other than "0" (corresponding to the case that (Xp$_{-1}$, Xm$_{-1}$) ≠(0, 0)), the redundant binary value (Xp$_{-2}$, Xm$_{-2}$) is inputted without any change to the second digit after the binary point thereof. Furthermore, a redundant binary value (Xp$_i$, Xm$_i$) is swapped to the third digit after the decimal point thereof. As is seen from Table 1, the swapping of Xp$_i$ and Xm$_i$ is equivalent to the inversion of the sign. Incidentally, in the foregoing description, only the configuration and operation for the calculation of the term (2−B) has been described. However, the configuration for the calculation of the term (3−B) can be easily implemented only by replacing the constant "010" set in case of calculating the term (2−B) with "100".

As above stated, in the multiplier recoding circuit according to the present invention, in order to calculate the term (2−B) or (3−B), selection circuits for selecting the constant and the usual input values are provided correspondingly to the high-order three digits of such a term, and a swapping circuit for performing the swapping operation is provided correspondingly to the second digit of such a term after the binary point, and swapping circuits are provided correspondingly to the digits, of which the orders are equal to or lower than that of the third digit after the binary point, of such a term. Therefore, the device of the present invention does not need to use a redundant binary number subtracting circuit which is used in the conventional device as above described. Further, the device of the present invention can calculate the terms (2−B) and (3−B) at a high speed with small-sized hardware.

In the foregoing description, only the multiplier recoding circuits respectively dedicated to the calculating of the term (2−B) and (3−B) have been explained. Hereinafter, the multiplier recoding circuit of the present invention, which inputs a further generalized term (A−B), will be described. Incidentally, A is a binary constant and B is an intermediate product represented by using a redundant binary number. Further, A and B have formats of the following expressions (24) and (25), respectively.

$$A = A_0.\ A_1 A_2 A_3 \ldots A_i \quad (24)$$

$$B = B_0.\ B_1 B_2 B_3 \ldots B_k \quad (25)$$

Moreover, the redundant binary intermediate product B is nearly equal to a constant value Bb. The difference (namely, an error) between B and Bb is expressed by the equation (26). Furthermore, the constant value Bb has a format as expressed by the expression (27).

$$B - Bb = \pm \alpha \cdot 2^{-j} \quad (26)$$

where $\alpha = 0.1^{***} \ldots$ (incidentally, $* = 0$ or 1).

$$Bb = Bb_0.\ Bb_1 Bb_2 Bb_3 \ldots Bb_m \quad (27)$$

Incidentally, it is supposed that i, m<j<k. Further, the term (A−B) is expressed by using the expressions (24) to (27) as the following equation (28). Additionally, in the equation (28), R designates the result, which is represented by using a redundant binary number, of a subtraction of B from A.

$$R = A - B \tag{28}$$
$$= (A - Bb) - (\pm a \cdot 2^{-j})$$

Furthermore, the equation (28) is modified by using components of each of A, B and R corresponding to all digits thereof.

$$A = A_0. A_1A_2A_3 \ldots A_l \tag{29}$$
$$-) B = B_0. B_1B_2B_3 \ldots\ldots\ldots\ldots\ldots\ldots\ldots\ldots B_k$$
$$R = R_0. R_1R_2R_3 \ldots\ldots\ldots R_mR_{m+1} \ldots\ldots\ldots\ldots$$

Here, as is seen from the equation (29), each of values (or components) held at digits, of which the orders are equal to or lower than that of the digit corresponding to $2^{-(i+1)}$, of R is obtained by subtracting a value held at a corresponding digit of B from 0. Thus, each of values held at digits, of which the orders are equal to or lower than that of the digit corresponding to $2^{-(i+1)}$, of R is a value obtained by inverting the sign of the value held at a corresponding digit of B. Further, as is seen form the equations (27) and (28), a part of R having digits of which the orders are equal to or higher than that of the digit corresponding to $2^{-m}$ becomes equal to $(A-Bb)$ or $(A-B\pm 2^{-m})$ when such a part of R is converted into a binary number. In case where such a part of R is equal to $(A-Bb)$, another part of R having digits of which the orders are equal to or lower than that of the digit corresponding to $2^{-(m+1)}$, becomes equal to $\pm a \cdot 2^{-j}$ when converted into a binary number. In case where the former part of R is equal to $(A-Bb\pm 2^{-m})$, another part of R having digits of which the orders are lower than that of the digit corresponding to $2^{-(m+1)}$, becomes equal to $-(\pm 2^{-m})\pm a \cdot 2^{-j}$ when converted into a binary number. Values of the part of R having digits, of which the orders are higher than that of the digit corresponding to $2^{-m}$, and values held at digits of R corresponding to $2^{-(m+1)}$, $2^{-(m+2)}$ and $2^{-(m+3)}$ are shown in Table 10. Incidentally, the digits corresponding to $2^{-m}$, $2^{-(m+1)}$, $2^{-(m+2)}$ and $2^{-(m+3)}$ will be sometimes referred to as $2^{-m}$—digit, $2^{-(m+1)}$—digit, $2^{-(m+2)}$—digit and $2^{-(m+3)}$—digit, respectively, hereinbelow.

TABLE 10

| $2^{-m}$-Digit & Higher-Order Digits | $2^{-(m+1)}$-Digit | $2^{-(m+2)}$-DIgit | $2^{-(m+3)}$-Digit |
|---|---|---|---|
| A − Bb + $2^{-m}$ | T | T | T |
| A − Bb | 1 | T | T |
| A − Bb | 0 | 1 | T |
| A − Bb | 0 | 0 | 1 |
| A − Bb | 0 | 0 | 0 |
| A − Bb | 0 | 0 | T |
| A − Bb | 0 | T | 1 |
| A − Bb | T | 1 | 1 |
| A − Bb − $2^{-m}$ | 1 | 1 | 1 |

As is seen from Table 10, the value represented by digits of R, of which the orders are equal to or higher than that of the digit corresponding to $2^{-m}$, is equal to a first value obtained by subtracting the constant Bb from the constant A, a second value greater than the first value by $2^{-m}$, or a third value smaller than the first value by $2^{-m}$.

Here, consider a case wherein there is an error at a digit corresponding to a binary value less than $2^{-(m+1)}$. First, values held at digits, of which the orders are lower than that of the digit corresponding to $2^{-m}$ and are equal to or higher than that of the digit corresponding to $2^{-(m+1)}$, are changed into 0. Namely, the value held at the digit corresponding to $2^{-(m+1)}$ is changed into 0. In Table 10, in case where the value represented by digits of R, of which the orders are equal to or higher than that of the digit corresponding to $2^{-m}$, is equal to $(A-Bb+2^{-m})$, a value held at the digit corresponding to $2^{-m}$ is propagated to the lower order digit through the sequence of Ts which are present at digits of which the orders are equal to or lower than that of the digit corresponding to $2^{-(m+1)}$. This occurs similarly in case that the value represented by digits of R, of which the orders are equal to or higher than that of the digit corresponding to $2^{-m}$, is equal to $(A-Bb-2^{-m})$. Thus, the relation among values of the part of R having digits, of which the orders are higher than that of the digit corresponding to $2^{-m}$, and values held at digits of R corresponding to $2^{-(m+1)}$, $2^{-(m+2)}$ and $2^{-(m+3)}$ becomes as shown in Table 11 listed below.

TABLE 11

| $2^{-m}$-Digit & Higher-Order Digits | $2^{-(m+1)}$-Digit | $2^{-(m+2)}$-DIgit | $2^{-(m+3)}$-Digit |
|---|---|---|---|
| A − B | 0 | 1 | T |
| A − B | 0 | 1 | T |
| A − B | 0 | 1 | T |
| A − B | 0 | 0 | 1 |
| A − B | 0 | 0 | 0 |
| A − B | 0 | 0 | T |
| A − B | 0 | T | 1 |
| A − B | 0 | T | 1 |
| A − B | 0 | T | 1 |

Therefore, in a case wherein there is an error at a digit corresponding to a binary value less than $2^{-(+1)}$, the calculation of the term $(A-B)$ can be performed in the following manner. As is shown in Table 11, the value $(A-Bb)$ is set at digits, of which the orders are equal to or higher than that of the digit corresponding to $2^{-m}$, and 0 is set at the digit corresponding to $2^{-(m+1)}$. If 0 is held at the digit corresponding to $2^{-(m+1)}$ in Table 10, a value held at the digit of R corresponding to $2^{-(m+2)}$ is set at the digit corresponding to $2^{-(m+2)}$. If a value other than 0 is held at the digit corresponding to $2^{-(m+1)}$ in Table 10, a value obtained by inverting the sign of the value held at the digit corresponding to $2^{-(m+2)}$ in Table 10 is set at the digit corresponding to $2^{-(m+2)}$. Regarding each of digits, of which the orders are equal to or lower than that of the digit corresponding to $2^{-(m+3)}$, the value held at the corresponding digit of R is set. As above described, tile value held at each digit, of which the order is lower than the digit corresponding to $2^{-m}$, of R is equal to a value obtained by inverting the sign of the corresponding value of B. Thus, the foregoing description is rewritten by using B instead of R as follows.

Namely, in a case that there is an error at a digit corresponding to a binary value less than $2^{-(m+1)}$, the calculation of the term $(A-B)$ can be performed in the following manner. As is shown in Table 11, the value $(A-Bb)$ is set at digits, of which the orders are equal to or higher than that of the digit corresponding to $2^{-m}$, and 0 is set at the digit corresponding to $2^{-(m+1)}$. If 0 is held at the digit corresponding to $2^{-(m+1)}$ in Table 10, a value obtained by inverting the sign of the value held at the digit of B corresponding to $2^{-(m+2)}$ is set at the digit corresponding to $2^{-(m+2)}$. If a value other than 0 is held at the digit corresponding to $2^{-(m+1)}$ in Table 10, the value held at the digit of B corresponding to $2^{-(m+2)}$ is set at the digit corresponding to $2^{-(m+2)}$.

Regarding each of digits, of which the orders are equal to or lower than that of the digit corresponding to $2^{-(m+3)}$, a value obtained by inverting the sign of the value held at the corresponding digit of B is set.

In the above description, has been described the case where there is an error at a digit corresponding to a binary value less than $2^{-(m+1)}$. Generally, in case where there is an error at a digit corresponding to a binary value less than $2^{-j}$, the calculation of the term (A−B) can be performed in the similar manner as follows. (Incidentally, $j \geq m+1$). First, the value (A−Bb) is set at digits, of which the orders are equal to or higher than that of the digit corresponding to $2^{-m}$, and 0 is set at the digits corresponding to binary numbers of from $2^{-(m+1)}$ to $Z^{-j}$. If 0 is held at the digit corresponding to $Z^{-j}$, a value obtained by inverting the sign of the value held at the digit of B corresponding to $Z^{-(j+1)}$ is set at the digit corresponding to $Z^{-(j+1)}$. If a value other than 0 is held at the digit corresponding to $Z^{-j}$, the value held at the digit of B corresponding to $Z^{-(j+1)}$ is set at the digit corresponding to $Z^{-(j+1)}$. Regarding each of digits, of which the orders are equal to or lower than that of the digit corresponding to $Z^{-(j+2)}$, a value obtained by inverting the sign of the value held at the corresponding digit of B is set.

The above explanation regarding the general case can be applied to the cases of calculating the terms (2−B) and (3−B) by using the following corresponding relation.

When calculating the term (2−B): A=2 and Bb=1; and

When calculating the term (3−B): A−3 and Bb=1.

Namely, the value (A−Bb) is set at digits (of the value of the term) before the binary point, and 0 is set at the first digit after the binary point. Further, a value obtained by inverting the sign of the value held at the first digit of B after the binary point is set at the second digit after the binary point. Moreover, regarding each of digits, of which the orders are equal to or lower than that of the third digit after the decimal point, a value obtained by inverting the sign of the value held at the corresponding digit of B is set or inputted.

AS stated above, the device of the present invention for performing an iterative multiplication operation in which a value obtained by subtracting the redundant binary result B of a multiplication from a constant A is used as a multiplier for the next multiplication can eliminate the necessity of using an adder for adding redundant binary numbers, which is used in the conventional device. Thus, the device of the present invention can perform such an iterative multiplication operation at a high speed by using small-sized hardware.

Incidentally, this embodiment of the present invention uses redundant binary numbers. However, the device of the present invention can perform such an iterative multiplication operation by using simple logics even in case of employing other types of number systems. Therefore, the present invention is very effective.

While preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A multiplication processing device having a first latch for inputting a multiplier, and a partial product generating and adding circuit, the multiplication processing device comprising:

a carry generating circuit connected to said first latch, said carry generating circuit having selection circuit means for selecting one of a constant number and a variable number and for outputting the number selected thereby, wherein said constant number and said variable number have a same format;

a multiplier recoding circuit connected to said first latch, to said carry generating circuit and to said partial product generating and adding circuit, said multiplier recoding circuit having:

first means for receiving signed digit data, the radix of which is 2, from said first latch and for dividing the received signed digit data into 2-digit sets and for calculating an intermediate sum $S_1$ and an intermediate carry $C_i$ from a value $Z_{gi}$ of an ith set wherein $Z_{gi}$ is given by $$Z_{gi} = 4 \times C_i + S_i$$

(where i represents natural numbers equal to or greater than a predetermined number L), and calculating a secondary intermediate Sum $R_1$ and a secondary intermediate carry $B_i$ corresponding to the ith set given by $$R_i = S_i + Q_{i-1}$$

and $$B_i = C_i + Q_1$$

by using a signal $Q_i$ representing the information indicating whether a value at a higher-order digit of the ith set is 1, by inputting a signal $Q_{L-1}$ corresponding to an (L−1)th set from said selection circuit means and by also using another signal $Q_{i-1}$ corresponding to an (i−1)th set; and second means for calculating a recoded value $Z_1$ given by $$Z_i = C_{i-1} + S_i = B_{i-1} + R_{i-1}$$

by using the secondary intermediate sum $R_i$, by inputting the selected number from said selection circuit means as the secondary intermediate carry $BL-1$ corresponding to the (L−1)th set and using the secondary intermediate carry $B_{i-1}$ corresponding to the (i−1)th set.

2. A multiplication processing device comprising:

first means for selecting a first part represented by digits at predetermined digit places having orders which are higher than a first predetermined digit position of an input number and of a constant and for outputting the selected first part of the input number and the constant;

second means for inverting a sign of a second part represented by digits at predetermined digit places having orders which are equal to and lower than a third predetermined digit position of the input number and for outputting the second part of the input number having the inverted sign;

third means for inverting a sign of a value represented by a second predetermined digit position of the input number and for outputting the value represented by the second predetermined digit position having the inverted sign if a value held at the first predetermined digit position is 0 and for outputting a value represented by the second predetermined digit position of the input number if the value held at the first predetermined digit position is other than 0; and recoding circuit means capable of inputting the values outputted from the first, second and third means.

3. The multiplication processing device as set forth in claim 2 further comprising iterating means for performing an iterative multiplication process, wherein said recoding circuit means further operates for rounding an intermediate result of said iterative multiplication process performed by said iterating means, thereby eliminating a rounding circuit from said iterating means of said multiplication processing device.

4. The multiplication processing device as set forth in claim 2 further comprising iterating means for performing an iterative multiplication process, wherein said first, second and third means and said recoding circuit means cooperate to provide logical inversions of corresponding input digits thereby eliminating a subtraction circuit for redundant numbers from said iterating means of said multiplication processing device.

5. The multiplication processing device as set forth in claim 2 further comprising iterating means for performing an iterative multiplication process, wherein said first, second and third means and said recoding circuit means cooperate to provide logical inversions of corresponding input digits thereby eliminating an adder circuit for redundant numbers from said iterating means of said multiplication processing device.

6. A multiplication processing device having a first latch for inputting a multiplier, and a partial product generating and adding circuit, the multiplication processing device comprising:

a carry generating circuit connected to said first latch, the carry generating circuit having selection circuit means for selecting one of a constant number and a variable number, said constant number and said variable number having a same format, said selection circuit means operating for outputting the selected number; and recoding circuit means, connected to said first latch, to said carry generating circuit and to said partial product generating and adding circuit, for receiving an M-digit number (where M is a natural number and N is equal to M in case of obtaining one set of N consecutive digits., and N is a natural number less than M in case of obtaining two or more sets of N consecutive digits from the M-digit number), the radix of which is Y, and for obtaining one or more sets of N consecutive digits from the M-digit number by using the M-digit number as the set of N consecutive digits when N is equal to M and, by dividing the M-digit number into the sets of N consecutive digits, for receiving the selected number from said selection circuit as an intermediate carry $C_{L-1}$ corresponding to an (L−1)th set (where L is a predetermined number) and for calculating an intermediate sum $S_i$ and an intermediate carry $C_i$ according to $Z_{gi} = C_i \times Y^N + S_i = Y^{N-1} X_{j+N-1} + \ldots + Y X_{j+1} + X_j$ (wherein $Z_{gi}$ is the value of an ith set, i represents natural numbers equal to or greater than the predetermined number L, and $X_{j+N-1}, \ldots X_{j+1}$ and $X_j$ are values of the N consecutive digits of the ith set), for adding the intermediate sum $S_L$ corresponding to the Lth set to the number received as the intermediate carry $C_{L-1}$ corresponding to an (L−1)th set and for adding the intermediate sum $S_i$ corresponding to the ith set to an intermediate carry $C_{i-1}$ corresponding to an (i−1)th set.

7. The multiplication processing device as set forth in claim 6 wherein said recoding circuit means comprises:

a plurality of recoding means, the number of which is equal to or greater than (M/N), wherein a kth one of said recoding means calculates an intermediate sum $S_{L+k-1}$ and an intermediate carry $C_{L+k-1}$ in accordance with a relation described by $Z_{g(L+k-1)} = C_{L+k-1} \times Y^N S_{L+k-1} = Y^{N-1} X_{j+N-1} + \ldots + Y X_{j+1} + X_j$ (where $Z_g(L+k-1)$ is the value of an (L+k−1)th set; and $X_{j+N-1}, \ldots X_{j+1}$ $X_j$ are the values of the N consecutive digits of the (L+k−1)th set)) and adds the intermediate sum $S_{L+k-1}$ corresponding to the (L+k−1)th set to an intermediate carry $C_{L+k-2}$ corresponding to an (L+k−2)th set, wherein each of said plurality of recoding means comprises:

first means for dividing the M-digit number into the N-digit sets and for calculating the intermediate sum $S_i$ and the intermediate carry $C_i$ in accordance with a relation described by $Z_{gi} = C_i \times Y^N + S_i$, $Z_{gi}$ being the value of the ith set; and second means for adding the intermediate sum $S_i$ to the intermediate carry $C_{i-1}$ corresponding to an (i−1)th set for each value of i, wherein said selection circuit means outputs the selected number to said recoding circuit means as the intermediate carry $C_{i-1}$.

8. The multiplication processing device as set forth in claim 6 which further comprises carry-due-to-rounding generating means for outputting a carry generated due to rounding to said selection circuit means.

9. The multiplication processing device as set forth in claim 6, wherein said recoding circuit means effects logical inversion of the M-digit number and then obtains one or more sets of the consecutive N digits from data obtained as a result of the logical inversion, and wherein a value of 1 is inputted to said selection circuit means and further said selection circuit means selects the input value of 1.

10. The multiplication processing device as set forth in claim 6 wherein signed digit data indicating the M-digit number is inputted to said recoding circuit means.

11. The multiplication processing device as set forth in claim 6 wherein a value of the carry saving type is inputted to said recoding circuit means.

12. The multiplication processing device as set forth in claim 6 further comprising iterating means for performing an iterative multiplication process, wherein said recoding circuit means further operates for rounding an intermediate result of said iterative multiplication process performed by said iterating means, thereby eliminating a rounding circuit from said iterating means of said multiplication processing device.

13. The multiplication processing device as set forth in claim 6 further comprising iterating means for performing an iterative multiplication process, wherein said recoding circuit means operates to provide logical inversions of corresponding digits input thereto, thereby eliminating a subtraction circuit for redundant numbers from said iterating means of said multiplication processing device.

14. The multiplication processing device as set forth in claim 6 further comprising iterating means for performing an iterative multiplication process, wherein said recoding circuit means operates to provide logical inversions of predetermined digits input thereto, thereby eliminating an adder circuit for redundant numbers from said iterating means of said multiplication processing device.

15. A multiplication processing device having a first latch for inputting a multiplier and a partial product generating and adding circuit, the multiplication processing device performing an iterative multiplication processing in which an intermediate result is rounded upon completion of each cycle of iterative multiplication, the multiplication processing device comprising:

a carry generating circuit connected to said first latch, said carry generating circuit having selection circuit means for selecting one of a constant number and a variable number and for outputting the number selected thereby, wherein said constant number and said variable number have a same format;

recoding circuit means, connected to said first latch, to said carry generating circuit and to said partial product generating and adding circuit, for receiving an M-digit number (wherein M is a natural number and N is equal to M in case of obtaining one set of N consecutive digits, and N is a natural number less than M in case of obtaining two or more sets of N consecutive digits from the M-digit number), the radix of which is Y, and for obtaining one or more sets of N consecutive digits from the M-digit number by using the M-digit number as the set of N consecutive digits when N is equal to M and, by dividing the M-digit number into the sets of N consecutive digits, for receiving the selected number from said selection circuit as an intermediate carry $C_{L-1}$ corresponding to an (L−1)th set (where L is a predetermined number) and for calculating an intermediate sum $S_i$ and an intermediate carry $C_i$ according to $Z_{gi} = C_i \times Y^N + S_i = Y^{N-i}X_{j+N-1} + \ldots + YX_{j+1} + X_j$ ($Z_{gi}$ is the value of an ith set (i represents natural number equal to or greater than the predetermined number L); and $X_{j+N-1}, \ldots X_{j+1}$ and $X_j$ are the values of the N consecutive digits of the ith set)), for adding the intermediate sum $S_L$ corresponding to the Lth set to the number received as the intermediate carry $C_{L-1}$ corresponding to an (L−1)th set and for adding the intermediate sum $S_i$ corresponding to the ith set to an intermediate carry $C_{i-1}$ corresponding to an (i−1)th set; and a carry-due-to-rounding generating means for generating a carry caused due to rounding from a part of the M-digit number, which part consists of digits having orders equal to or less than the lowest-order digit of the Lth set, and for outputting the carry caused due to rounding to said selection means, wherein the numbers to be selected by said selection circuit means are 0 and the carry caused due to rounding, and said selection circuit means selects 0 in a first cycle of iterative multiplication and selects the carry caused due to rounding in each cycle subsequent to the first cycle.

* * * * *